US008248014B2

(12) United States Patent
Berman et al.

(10) Patent No.: US 8,248,014 B2
(45) Date of Patent: Aug. 21, 2012

(54) AUTOMATED SHADE CONTROL SYSTEM

(75) Inventors: Joel Berman, Hewlett, NY (US); Jan Berman, Wilton, CT (US); Alex Greenspan, Hempstead, NY (US); Stephen P. Hebeisen, Somers, NY (US)

(73) Assignee: MechoShade Systems, Inc., Long Island City, NY (US)

( * ) Notice: Subject to any disclaimer, the term of this patent is extended or adjusted under 35 U.S.C. 154(b) by 0 days.

(21) Appl. No.: 13/343,912

(22) Filed: Jan. 5, 2012

(65) Prior Publication Data
US 2012/0126737 A1 May 24, 2012

Related U.S. Application Data

(63) Continuation of application No. 12/475,312, filed on May 29, 2009, now Pat. No. 8,120,292, which is a continuation-in-part of application No. 12/421,410, filed on Apr. 9, 2009, now Pat. No. 8,125,172, which is a continuation-in-part of application No. 12/197,863, filed on Aug. 25, 2008, now Pat. No. 7,977,904, which is a continuation-in-part of application No. 11/162,377, filed on Sep. 8, 2005, now Pat. No. 7,417,397, which is a continuation-in-part of application No. 10/906,817, filed on Mar. 8, 2005, now abandoned.

(60) Provisional application No. 60/521,497, filed on May 6, 2004.

(51) Int. Cl.
*G05B 5/00* (2006.01)
(52) U.S. Cl. .......... 318/466; 318/471; 318/455
(58) Field of Classification Search .......... 318/466, 318/471, 445, 286, 480, 468, 280; 160/5, 160/206
See application file for complete search history.

(56) References Cited

U.S. PATENT DOCUMENTS

| 2,464,623 A | 3/1949 | Vogel |
| 3,042,001 A | 7/1962 | Dubie |
| 3,294,152 A | 12/1966 | Kuijvenhoven |
| 3,675,023 A | 7/1972 | Kunke et al. |
| 3,696,845 A | 10/1972 | Acker et al. |
| 3,710,597 A | 1/1973 | Schmidt |
| 3,860,055 A | 1/1975 | Wild |
| 3,965,348 A | 6/1976 | Anetseder, Sr. et al. |
| 4,377,195 A | 3/1983 | Weil |

(Continued)

FOREIGN PATENT DOCUMENTS

DE 4023673 6/1992

(Continued)

OTHER PUBLICATIONS

Office Action dated Mar. 16, 2009 for U.S. Appl. No. 11/539,559.

(Continued)

*Primary Examiner* — Karen Masih
(74) *Attorney, Agent, or Firm* — Snell & Wilmer L.L.P.

(57) ABSTRACT

Automated shade systems comprise motorized window coverings, sensors, and controllers that use algorithms to control operation of the automated shade control system. These algorithms may include information such as: 3-D models of a building and surrounding structures, shadow information, reflectance information, lighting and radiation information, ASHRAE clear sky algorithms, log information related to manual overrides, occupant preference information, motion information, real-time sky conditions, solar radiation on a building, a total foot-candle load on a structure, brightness overrides, actual and/or calculated BTU load, time-of-year information, and microclimate analysis.

23 Claims, 13 Drawing Sheets

U.S. PATENT DOCUMENTS

| | | | |
|---|---|---|---|
| 4,397,346 | A | 8/1983 | Chumbley et al. |
| 4,610,294 | A | 9/1986 | Anesi et al. |
| 4,622,470 | A | 11/1986 | Makino et al. |
| 4,698,276 | A | 10/1987 | Duval |
| 4,712,104 | A | 12/1987 | Kobayashi |
| 4,727,918 | A | 3/1988 | Schroeder |
| 4,766,941 | A | 8/1988 | Sloop et al. |
| 4,864,201 | A | 9/1989 | Bernot |
| 4,915,763 | A | 4/1990 | Swiszcz |
| 4,979,550 | A | 12/1990 | Long et al. |
| 5,063,984 | A | 11/1991 | Cherveny |
| 5,142,133 | A | 8/1992 | Kern et al. |
| 5,205,333 | A | 4/1993 | Judkins |
| 5,237,169 | A | 8/1993 | Grehant |
| 5,371,447 | A | 12/1994 | Boss |
| 5,467,808 | A | 11/1995 | Bell |
| 5,532,560 | A | 7/1996 | Element et al. |
| 5,566,471 | A | 10/1996 | Hirano |
| 5,598,000 | A | 1/1997 | Popat |
| 5,648,656 | A | 7/1997 | Begemann et al. |
| 5,655,585 | A | 8/1997 | Fry |
| 5,662,147 | A | 9/1997 | Haiber |
| 5,663,621 | A | 9/1997 | Popat |
| 5,675,487 | A | 10/1997 | Patterson et al. |
| 5,793,174 | A | 8/1998 | Kovach et al. |
| 6,024,156 | A | 2/2000 | Chu |
| 6,064,949 | A | 5/2000 | Werner et al. |
| 6,084,231 | A * | 7/2000 | Popat ............... 250/214 AL |
| 6,103,345 | A | 8/2000 | Oshima et al. |
| 6,263,260 | B1 | 7/2001 | Bodmer et al. |
| 6,307,331 | B1 | 10/2001 | Bonasia et al. |
| 6,983,783 | B2 | 1/2006 | Carmen et al. |
| 7,085,627 | B2 | 8/2006 | Bamberger et al. |
| 7,977,904 | B2 | 7/2011 | Berman et al. |
| 2003/0221800 | A1 * | 12/2003 | Jones ............... 160/168.1 R |
| 2005/0110416 | A1 | 5/2005 | Veskovic |
| 2005/0215147 | A1 | 9/2005 | Masters et al. |
| 2005/0234596 | A1 | 10/2005 | Rietschel |
| 2006/0185799 | A1 | 8/2006 | Kates |
| 2006/0207730 | A1 | 9/2006 | Berman et al. |
| 2007/0187042 | A1 | 8/2007 | Kallstrom |
| 2007/0248246 | A1 | 10/2007 | Cherkassky et al. |
| 2008/0115425 | A1 | 5/2008 | Forbis et al. |
| 2009/0254222 | A1 | 10/2009 | Berman et al. |
| 2011/0220299 | A1 | 9/2011 | Berman et al. |

FOREIGN PATENT DOCUMENTS

| | | |
|---|---|---|
| EP | 1069277 | 1/2001 |
| GB | 443773 | 5/2008 |
| JP | 10317849 | 2/1988 |
| JP | 01219283 | 9/1989 |
| JP | 03017381 | 1/1991 |
| JP | 04044589 | 2/1992 |
| JP | 1072985 | 3/1998 |
| JP | 2000054762 | 2/2000 |
| JP | 2000096956 | 4/2000 |
| JP | 2001295154 | 10/2001 |
| JP | 20020129852 | 5/2002 |
| WO | 9200557 | 1/1992 |
| WO | 2007006775 | 1/2007 |

OTHER PUBLICATIONS

Office Action dated Sep. 14, 2009 for U.S. Appl. No. 11/539,559.
Notice of Allowance dated Nov. 9, 2009 for U.S. Appl. No. 11/539,559.
Office Action dated Apr. 21, 2008 for U.S. Appl. No. 11/162,377.
Office Action dated May 22, 2008 for U.S. Appl. No. 11/162,377.
Notice of Allowance dated Jul. 11, 2008 for U.S. Appl. No. 11/162,377.
Notice of Allowance dated Feb. 1, 2010 for Canadian Patent Application No. 08910792CA.
Office Action dated Jul. 30, 2009 for Canadian Patent Application No. 08910792CA.
Notice of Allowance dated Apr. 27, 2011, U.S. Appl. No. 12/197,863.
Restriction Requirement dated Mar. 7, 2011, U.S. Appl. No. 12/197,863.
Office Action dated Apr. 6, 2011, U.S. Appl. No. 12/197,863.
Office Action dated Sep. 21, 2011 in U.S. Appl. No. 12/421,410.
USPTO; Office Action dated Oct. 19, 2011 in U.S. Appl. No. 12/475,312.
USPTO; Notice of Allowance dated Dec. 12, 2011 in U.S. Appl. No. 12/475,312.
USPTO; Notice of Allowance dated Jan. 11, 2012 in U.S. Appl. No. 12/421,410.
International Search Report and Written Opinion dated Aug. 10, 2009 for International Application No. PCT/US2009/48387.
International Search Report and Written Opinion dated Apr. 24, 2008 for International Application No. PCT/US2006/032874.
International Preliminary Report on Patentability dated Apr. 16, 2009 for International Application No. PCT/US2006/032874.
Search and Examination Report dated Dec. 18, 2009 for GB Patent Application No. GB0804163.4.
Examination Report dated Jul. 21, 2009 for GB Patent Application No. GB0804163.4.
Search and Examination Report dated Dec. 18, 2009 for GB Patent Application No. GB0920586.5.
Search and Examination Report dated Dec. 18, 2009 for GB Patent Application No. GB0920589.9.
Search and Examination Report dated Dec. 18, 2009 for GB Patent Application No. GB0920602.0.
UK Examination Report dated May 25, 2010 for GB Patent Application No. GB2443773.
UK Examination Report dated May 19, 2010 for GB Patent Application No. GB0920586.5.
UK Examination Report dated Feb. 25, 2010 for GB Patent Application No. GB0920586.5.
UK Examination Report dated Apr. 7, 2010 for GB Patent Application No. GB0920589.9.
UK Examination Report dated Feb. 24, 2010 for GB Patent Application No. GB0920589.9.
UK Examination Report dated May 20, 2010 for GB Patent Application No. GB0920602.0.
UK Examination Report dated Feb. 24, 2010 for GB Patent Application No. GB0920602.0.
International Preliminary Report on Patentability dated Feb. 14, 2011 for International Application No. PCT/US09/48387.
CA; Restriction Requirement dated Oct. 6, 2011 in Canadian Application No. 2,708,374.
SolarTrac Specifications Document—created Nov. 7, 2007.
"Managing Light and Energy Along the Windowed Wall: Part 1," Hunter Douglas, 2006, 64 Pages.
Nysan Control Systems Brochure, Hunter Douglas 2007, 20 Pages.
"Pilot Daylight Weather Control System," Hunter Douglas, Jul. 10, 2008, 7 Pages.
Facade Controller overview, Embedia Technologies, 2009, 3 Pages, retrieved from: http://www.embedia.com/façade-controller on Aug. 11, 2011.
Jordaans, A. A., "Computer Program for Calculating the Daylight Level in a Room,"Energy and Building, Institute of Applied Physics, 1984, pp. 207-212.
Krieder, Jan et al., "Solar Radiation and Windows," Heating and Cooling of Buildings: Design for Efficiency, McGraw-Hill College, Jan. 1, 1994, pp. 220-269.
Krieder, Jan et al., "Lighting," Heating and Cooling of Buildings: Design for Efficiency, McGraw-Hill College, Jan. 1, 1994, pp. 668-693.
GB; Exam Report dated Mar. 12, 2012 in Application No. 1102612.7.
"Animeo IB+—a complete and autonomous solution for blind and window automation in commercial buildings," Somfy, pp. 1-11.

Galata, et al. "A Smart Control Strategy for Shading Devices to Improve the Thermal and Visual Comfort," 4th European Conference on SolarEnergy and UrbanPlanning, Berlin, Mar. 1996, Paper No. 5.16, pp. 1-4.

Gueymard, "Critical Analysis and Performance Assessment of Clear Sky Solar Irradiance Models Using Theoretical and Measured Data," Solar Energy, vol. 51, No. 2, 1993, pp. 121-138.

Klems, et al., "Solar Heat Gain Coefficient of Complex Fenestrations with a Venetian Blind for Differing Slat Tilt Angles," Ashrae Transactions, vol. 103, No. 1, 1997 Symposis, pp. 1026-1034.

Wurmsdobler, "Simulation of a Heated Room with Window Blind Control," Documentation for the Simulation Program and the Fuzzy Control Algorithm used, Sep. 1994, pp. 1-9.

Guillemin, et al., "An energy-efficient controller for shading devices self-adapting to the user wishes," Building and Environment 37, 2002, pp. 1091-1097.

Bauer, et al., "Delta: A Blind Controller Using Fuzzy Logic," Final Report, Nov. 1996, pp. 1-134.

* cited by examiner

AUTOMATED SHADE CONTROL SYSTEM

CROSS REFERENCE TO RELATED APPLICATIONS

This application is a continuation of U.S. Ser. No. 12/475,312 filed on May 29, 2009, now U.S. Patent Application Publication No. 2009/0254222 entitled "Automated Shade Control Reflectance Module". U.S. Ser. No. 12/475,312 is a continuation-in-part of U.S. Ser. No. 12/421,410 filed on Apr. 9, 2009, now U.S. Patent Application Publication No. 2009/0222137 entitled "Automated Shade Control Method and System". U.S. Ser. No. 12/421,410 is a continuation-in-part of U.S. Ser. No. 12/197,863 filed on Aug. 25, 2008, now U.S. Pat. No. 7,977,904 entitled "Automated Shade Control Method and System." U.S. Ser. No. 12/197,863 is a continuation-in part of U.S. Ser. No. 11/162,377 filed on Sep. 8, 2005, now U.S. Pat. No. 7,417,397 entitled "Automated Shade Control Method and System." U.S. Ser. No. 11/162,377 is a continuation-in-part of U.S. Ser. No. 10/906,817 filed on Mar. 8, 2005, and entitled "Automated Shade Control Method and System." U.S. Ser. No. 10/906,817 is a non-provisional of U.S. Provisional No. 60/521,497 filed on May 6, 2004, and entitled "Automated Shade Control Method and System." The entire contents of all of the foregoing applications are hereby incorporated by reference.

FIELD OF INVENTION

This invention generally relates to automatic shade control, and more specifically, to automated shade systems that employ a reflectance module.

BACKGROUND OF THE INVENTION

A variety of automated systems currently exist for controlling blinds, drapery, and other types of window coverings. These systems often employ photo sensors to detect the visible light (daylight) entering through a window. The photo sensors may be connected to a computer and/or a motor that automatically opens or closes the window covering based upon the photo sensor and/or temperature read-out.

While photo sensors and temperature sensors may be helpful in determining the ideal shading for a window or interior, these sensors may not be entirely effective. As such, some shade control systems employ other criteria or factors to help define the shading parameters. For example, some systems employ detectors for detecting the angle of incidence of sunlight. Other systems use rain sensors, artificial lighting controls, geographic location information, date and time information, window orientation information, and exterior and interior photo sensors to quantify and qualify an optimum position for a window covering. However, no single system currently employs all of these types of systems and controls.

Moreover, most automated systems are designed for, and limited for use with, Venetian blinds, curtains and other traditional window coverings. Further, prior art systems generally do not utilize information related to the variation of light level within the interior of a structure. That is, most systems consider the effects of relatively uniform shading and/or brightness and veiling glare, rather than graduated shading and/or brightness and veiling glare. Therefore, there is a need for an automated shade control system that contemplates graduated shading and optimum light detection and adaptation.

It has been determined that the most efficient energy design for buildings is to be able to take advantage of natural daylight which allows for the reduction in artificial lighting which in turn reduces the Air Conditioning load, which reduces the energy consumption of a building. To achieve these goals, the glazing has to allow a high percentage of daylight to penetrate the glazing, by using clear or high visible light transmitting glazing. But with the high amount of visible light there is also the bright orb of the sun, excessive heat gain, and debilitating solar rays which will at different times of the year and on different solar orientations penetrate deeply into the building, effecting and impacting the persons working or living therein. Thus, a need exists to manage and control the amount of solar load, solar penetration, and temperatures of the window wall. In addition, there is a need to control the amount of solar radiation and brightness to acceptable norms that protect the comfort and health of the occupants, e.g. an energy conserving integrated sub-system.

SUMMARY OF THE INVENTION

Systems and methods for automated shade control using a reflectance module are disclosed. In an embodiment, a reflective object or surface is modeled by the computer to create a reflectance model in the computer memory. The reflectance model is queried a first time to calculate the presence of calculated reflected light at a location of interest. A window covering is moved responsive to the calculated reflected light at the location of interest. The system that moves the window covering comprises a motor, and a window covering associated with a window, wherein the motor is configured to actuate the window covering. A motor controller is configured to control the motor using reflectance information.

In another embodiment, a computer-readable medium has stored thereon, computer-executable instructions that, if executed by a system, cause the system to perform a method. The method comprises modeling a reflective surface or object to create a reflectance model, querying the reflectance model to calculate the presence of calculated reflected light at a location of interest, and adjusting a window covering responsive to the calculated reflected light at the location of interest.

BRIEF DESCRIPTION OF THE DRAWINGS

The accompanying drawings, wherein like numerals depict like elements, illustrate exemplary embodiments of the present invention, and together with the description, serve to explain the principles of the invention. In the drawings.

DETAILED DESCRIPTION

Figure 1:
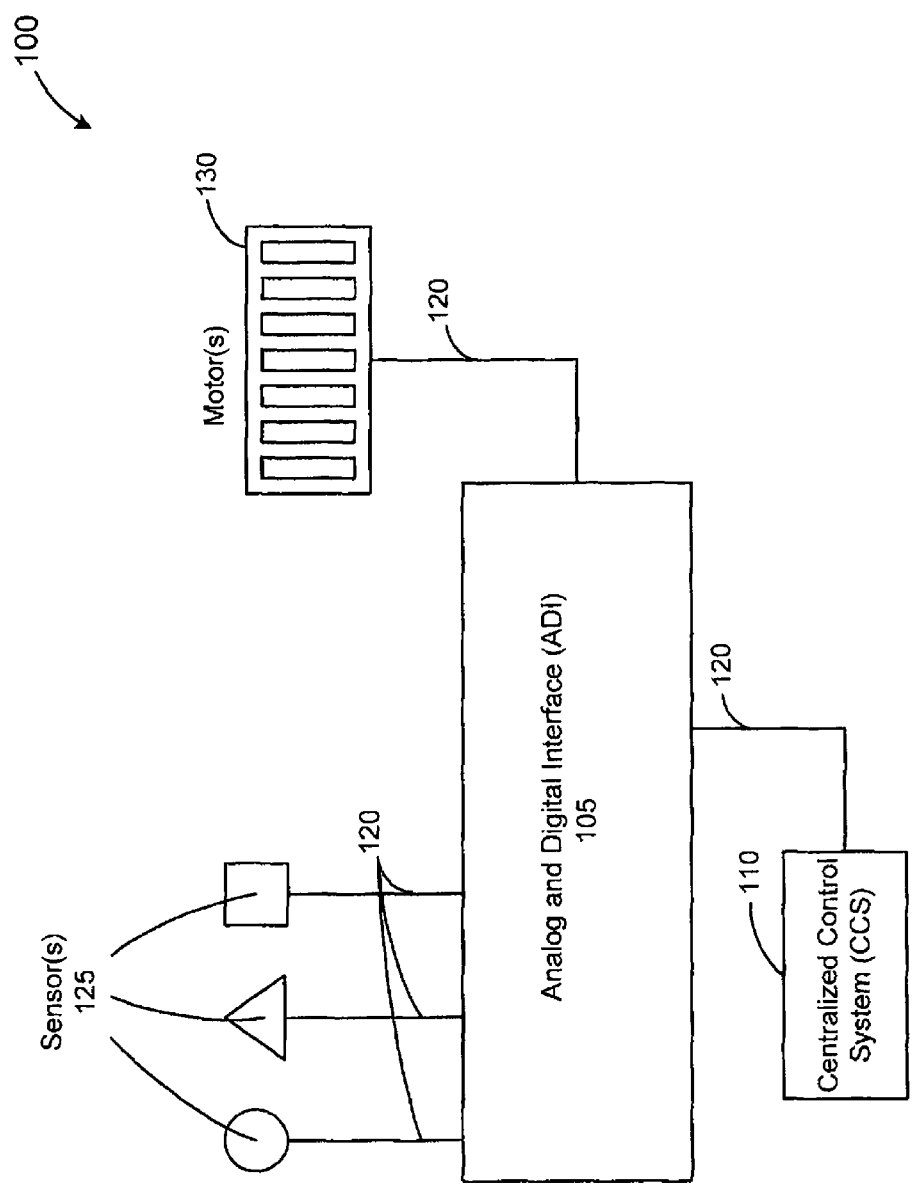
FIG. 1 illustrates a block diagram of an exemplary automated shade control system in accordance with the present invention.

The detailed description of exemplary embodiments of the invention herein shows the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present invention may be described herein in terms of block diagrams, screen shots and flowcharts, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, Delphi, extensible markup language (XML), smart card technologies with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, and Source Code In C," by Bruce Schneier, published by John Wiley & Sons (second edition, 1996); (2) "Java Cryptography" by Jonathan Knudson, published by O'Reilly & Associates (1998); (3) "Cryptography and Network Security: Principles and Practice" by William Stallings, published by Prentice Hall; all of which are hereby incorporated by reference.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point-of-interaction device (point-of-sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communication protocols, the invention may also be implemented using IPX, Appletalk, IP-6, NetBIOS, OSI, Lonworks or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, "Internet Standards and Protocols," (1998); "Java 2 Complete," various authors, (Sybex 1999); Deborah Ray and Eric Ray, "Mastering HTML 4.0," (1997); Loshin, "TCP/IP Clearly Explained," (1997); and David Gourley and Brian Totty, "HTTP, The Definitive Guide," (2002), the contents of which are hereby incorporated by reference.

The various system components may be independently, separately or collectively suitably coupled to the network via data links which include, for example, a connection to an Internet Service Provider (ISP) over the local loop as is typically used in connection with a standard modem communication, cable modem, Dish network, ISDN, Digital Subscriber Line (DSL), or various wireless communication methods, see, e.g., Gilbert Held, "Understanding Data Communications," (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

FIG. 1 illustrates an exemplary automated shade control (ASC) system 100 in accordance with the present invention. ASC 100 may comprise an analog and digital interface (ADI) 105 configured for communicating with centralized control system (CCS) 110, motors 130, and sensors 125. ADI 105 may communicate with CCS 110, motors 130, sensors 125 and/or any other components through communication links 120. For example, in one embodiment, ADI 105 and CCS 110 are configured to communicate directly with motors 130 to minimize lag time between computing commands and motor movement.

ADI 105 may be configured to facilitate transmitting shade position commands and/or other commands. ADI 105 may also be configured to interface between CCS 110 and motors 130. ADI 105 may be configured to facilitate user access to motors 130. By facilitating user access, ADI 105 may be configured to facilitate communication between a user and motors 130. For example, ADI 105 may allow a user to access some or all of the functions of motors 130 for any number of zones. ADI 105 may use communication links 120 for communication, user input, and/or any other communication mechanism for providing user access.

ADI 105 may be configured as hardware and/or software. While FIG. 1 depicts a single ADI 105, ASC 100 may comprise multiple ADIs 105. In one embodiment, ADI 105 may be configured to allow a user to control motors 130 for multiple window coverings. As used herein, a zone refers to any area of a structure wherein ASC 100 is configured to control the shading. For example, an office building may be divided into eight zones, each zone corresponding to a different floor. Each zone, in turn may have 50 different glazings, windows and/or window coverings. Thus, ADI 105 may facilitate controlling each motor in each zone, some or all window coverings for some or all floors (or portion thereof), and/or multiple ADIs 105 (i.e., two, four, eight, or any other suitable number of different ADIs 105) may be coupled together to collectively control some or all window coverings, wherein each ADI 105 controls the motors 130 for each floor. Moreover, ASC 100 may log, record, classify, quantify, and otherwise measure and/or store information related to one or more window coverings. Additionally, each ADI 105 may be addressable, such as via an interne protocol (IP) address, a MAC address, and/or the like.

ADI 105 may also be configured with one or more safety mechanisms. For example, ADI 105 may comprise one or more override buttons to facilitate manual operation of one or more motors 130 and/or ADIs 105. ADI 105 may also be configured with a security mechanism that requires entry of a password, code, biometric, or other identifier/indicia suitably configured to allow the user to interact or communicate with the system, such as, for example, authorization/access code, personal identification number (PIN), Internet code, bar code, transponder, digital certificate, biometric data, and/or other identification indicia.

CCS 110 may be used to facilitate communication with and/or control of ADI 105. CCS 110 may be configured to facilitate computing of one or more algorithms to determine, for example, solar radiation levels, sky type (such as clear, overcast, bright overcast, and/or the like), interior lighting information, exterior lighting information, temperature information, glare information, shadow information, reflectance information, and the like. CCS 110 algorithms may include proactive and reactive algorithms configured to provide appropriate solar protection from direct solar penetration; reduce solar heat gain; reduce radiant surface temperatures and/or veiling glare; control penetration of the solar ray, optimize the interior natural daylighting of a structure and/or optimize the efficiency of interior lighting systems. CCS 110 algorithms may operate in real-time. CCS 110 may be configured with a RS-485 communication board to facilitate receiving and transmitting data from ADI 105. CCS 110 may be configured to automatically self-test, synchronize and/or start the various other components of ASC 100. CCS 110 may be configured to run one or more user interfaces to facilitate user interaction. An example of a user interface used in conjunction with CCS 110 is described in greater detail below.

CCS 110 may be configured as any type of computing device, personal computer, network computer, work station, minicomputer, mainframe, or the like running any operating system such as any version of Windows, Windows NT, Windows XP, Windows 2000, Windows 98, Windows 95, MacOS, OS/2, BeOS, Linux, UNIX, Solaris, MVS, DOS or the like. The various CCS 110 components or any other components discussed herein may include one or more of the following: a host server or other computing system including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. The user may interact with the system via any input device such as a keypad, keyboard, mouse, kiosk, personal digital assistant, handheld computer (e.g., Palm Pilot®, Blackberry®), cellular phone and/or the like.

CCS 110 may also be configured with one or more browsers, remote switches and/or touch screens to further facilitate access and control of ASC 100. For example, each touch screen communicating with CCS 110 can be configured to facilitate control of a section of a building's floor plan, with motor zones and shade zones indicated (described further herein). A user may use the touch screen to select a motor zone and/or shade zone to provide control and/or obtain control and/or alert information about the shade position of that particular zone, current sky condition information, sky charts, global parameter information (such as, for example, local time and/or date information, sunrise and/or sunset information, solar altitude or azimuth information, and/or any other similar information noted herein), floor plan information (including sensor status and location) and the like. The touch screen may also be used to provide control and/or information about the brightness level of a local sensor, to provide override capabilities of the shade position to move a shade to a more desired location, and/or to provide access to additional shade control data that is captured for each particular zone. The browser, touch screen and/or switches may also be configured to log user-directed movement of the shades, manual over-rides of the shades, and other occupant-specific adaptations to ASC 100 and/or each shade and/or motor zone. As another example, the browser, touch screen and/or switches may also be configured to provide remote users access to particular data and shade functions depending upon each remote user's access level. For example, the access levels may, for example, be configured to permit only certain individuals, levels of employees, companies, or other entities to access ASC 100, or to permit access to specific ASC 100 control parameters. Furthermore, the access controls may restrict/permit only certain actions such as opening, closing, and/or adjusting shades. Restrictions on radiometer controls, algorithms, and the like may also be included.

CCS 110 may also be configured to be responsive to one or more alarms, warnings, error messages, and/or the like. For example, CCS 110 may be configured to move one or more window coverings responsive to a fire alarm signal, a smoke alarm signal, or other signal, such as a signal received from a building management system. Moreover, CCS 100 may further be configured to generate one or more alarms, warnings, error messages, and/or the like. CCS 110 may transmit or otherwise communicate an alarm to a third party system, for example a building management system, as appropriate.

CCS 110 may also be configured with one or more motor controllers. The motor controller may be equipped with one or more algorithms which enable it to position the window covering based on automated and/or manual control from the user through one or a variety of different user interfaces which communicate to the controller. CCS 110 may provide control of the motor controller via hardwired low voltage dry contact, hardwired analog, hardwired line voltage, voice, wireless IR, wireless RF or any one of a number of low voltage, wireless and/or line voltage networking protocols such that a multiplicity of devices including, for example, switches, touch screens, PCs, Internet Appliances, infrared remotes, radio frequency remotes, voice commands, PDAs, cell phones, PIMs, etc. are capable of being employed by a user to automatically and/or manually override the position of the window covering. CCS 110 and/or the motor controller may additionally be configured with a real time clock to facilitate real time synchronization and control of environmental and manual override information.

CCS 110 and/or the motor controller is also equipped with algorithms which enable it to optimally position the window covering for function, energy efficiency, light pollution control (depending on the environment and neighbors), cosmetic and/or comfort automatically based on information originating from a variety of sensing device options which can be configured to communicate with the controller via any of the communication protocols and/or devices described herein. The automation algorithms within the motor controller and/or CCS 110 may be equipped to apply both proactive and reactive routines to facilitate control of motors 130. Proactive and reactive control algorithms are described in greater detail herein.

CCS 110 algorithms may use occupant-initiated override log data to learn what each local zone occupant prefers for his optimal shading. This data tracking may then be used to automatically readjust zone-specific CCS 110 algorithms to adjust one or more sensors 125, motors 130 and/or other ASC 100 system components to the needs, preferences, and/or desires of the occupants at a local level. That is, ASC 100 may be configured to actively track each occupant's adjustments for each occupied zone and actively modify CCS 110 algorithms to automatically adapt to each adjustment for that particular occupied zone. CCS 110 algorithms may include a touch screen survey function. For example, this function may allow a user to select from a menu of reasons prior to overriding a shade position from the touch screen. This data may be saved in a database associated with CCS 110 and used to fine tune ASC 100 parameters in order to minimize the need for such overrides. Thus, CCS 110 can actively learn how a building's occupants use the shades, and adjust to these shade uses. In this manner, CCS 110 may fine-tune, refine, and/or otherwise modify one or more proactive and/or reactive algorithms responsive to historical data.

For example, proactive and reactive control algorithms may be used based on CCS 110 knowledge of how a building's occupants use window coverings. CCS 110 may be configured with one or more proactive/reactive control algorithms that proactively input information to/from the motor controller facilitate adaptability of ASC 100. Proactive control algorithms include information such as, for example, the continuously varying solar angles established between the sun and the window opening over each day of the solar day. This solar tracking information may be combined with knowledge about the structure of the building and window opening, as well. This structural knowledge includes, for example, any shadowing features of the building (such as, for example, buildings in the cityscape and topographical conditions that may shadow the sun's ray on the window opening at various times throughout the day/year). Further still, any inclination or declination angles of the window opening (i.e., window, sloped window, and/or skylight), any scheduled positioning of the window covering throughout the day/year, information about the British thermal unit (BTU) load impacting the window at anytime throughout the day/year; the glass characteristics which affect transmission of light and heat through the glass, and/or any other historical knowledge about performance of the window covering in that position from previous days/years may be included in the proactive control algorithms. Proactive algorithms can be setup to optimize the positioning of the window covering based on a typical day, worst case bright day or worst case dark day depending on the capabilities and information made available to the reactive control algorithms. These algorithms further can incorporate at least one of the geodesic coordinates of a building; the actual and/or calculated solar position; the actual and/or calculated solar angle; the actual and/or calculated solar penetration angle; the actual and/or calculated solar penetration depth through the window, the actual and/or calculated solar radiation; the actual and/or calculated solar intensity; the time; the solar altitude; the solar azimuth; sunrise and sunset times; the surface orientation of a window; the slope of a window; the window covering stopping positions for a window; and the actual and/or calculated solar heat gain through the window.

Additionally, proactive and/or reactive control algorithms may be used based on measured and/or calculated brightness. For example, CCS 110 may be configured with one or more proactive and/or reactive control algorithms configured to measure and/or calculate the visible brightness on a window. Moreover, the proactive and/or reactive control algorithms may curve fit (e.g. regression analysis) measured radiation and/or solar heat gain in order to generate estimated and/or measured foot-candles on the glazing, foot-candles inside the glass, foot-candles inside the shade and class combination, and the like. Additionally, the proactive and/or reactive control algorithms may utilize lighting information, radiation information, brightness information, reflectance information, solar heat gain, and/or any other appropriate factors to measure and/or calculate a total foot-candle load on a structure.

Further, proactive and/or reactive control algorithms may be used based on measured and/or calculated BTU loads on a window, glass, window covering, and/or the like. CCS 110 may be configured with one or more proactive and/or reactive control algorithms configured to measure and/or calculate the BTU load on a window. Moreover, the proactive and/or reactive control algorithms may take any appropriate action responsive to a measured and/or calculated BTU load, including, for example, generating a movement request to one or more ADIs 105 and/or motors 130. For example, CCS 110 may generate a movement request to move a window covering into a first position in response to a measured load of 75 BTUs inside a window. CCS 110 may generate another movement request to move a window covering into a second position in response to a measured load of 125 BTUs inside a window. CCS 110 may generate yet another movement request to move a window covering into a third position responsive to a measured load of 250 BTUs inside a window, and so on. Additionally, CCS 110 may calculate the position of a window covering based on a measured and/or calculated BTU load on a window. Information regarding measured and/or calculated BTU loads, shade positions, and the like may be viewed on any suitable display device In various embodiments, CCS 110 may be configured with predefined BTU loads associated with positions of a window covering. For example, a "fully open" position of a window covering may be associated with a BTU load of 500 BTUs per square meter per hour. A "halfway open" position may be associated with a BTU load of 300 BTUs per square meter per hour. A "fully closed" position may be associated with a BTU load of 100 BTUs per square meter per hour. Any number of predefined BTU loads and/or window covering positions may be utilized. In this manner, CCS 110 may be configured to move one or more window coverings into various predefined positions in order to modify the intensity of the solar penetration and resulting BTU load on a structure.

Reactive control algorithms may be established to refine the proactive algorithms and/or to compensate for areas of the building which may be difficult and/or unduly expensive to model. Reactive control of ASC 100 may include, for example, using sensors coupled with algorithms which determine the sky conditions, brightness of the external horizontal sky, brightness of the external vertical sky in any/all orientation(s), internal vertical brightness across the whole or a portion of a window, internal vertical brightness measured across the whole or a portion of a window covered by the window covering, internal horizontal brightness of an internal task surface, brightness of a vertical or horizontal internal surface such as the wall, floor or ceiling, comparative brightness between differing internal horizontal and/or vertical surfaces, internal brightness of a PC display monitor, external temperature, internal temperature, manual positioning by the user/occupant near or affected by the window covering setting, overrides of automated window covering position from previous years and/or real time information communicated from other motor controllers affecting adjacent window coverings.

Typical sensors 125 facilitating these reactive control algorithms include radiometers, photometers/photosensors, motion sensors, wind sensors, and/or temperature sensors to detect, measure, and communicate information regarding temperature, motion, wind, brightness, radiation, and/or the like, or any combination of the foregoing. For example, motion sensors may be employed in order to track one or more occupants and change reactive control algorithms in certain spaces, such as conference rooms, during periods where people are not present in order to optimize energy efficiency. The invention contemplates various types of sensor mounts. For example, types of photosensor and temperature sensor mounts include handrail mounts (between the shade and window glass), furniture mounts (e.g., on the room side of the shade), wall or column mounts that look directly out the window from the room side of the shade, and external sensor mounts. For example, for brightness override protection, one or more photosensors and/or radiometers may be configured to look through a specific portion of a window wall (e.g., the part of the window wall whose view gets covered by the window covering at some point during the movement of the window covering). If the brightness on the window wall portion is greater than a pre-determined ratio, the brightness override protection may be activated. The predetermined ratio may be established from the brightness of the PC/VDU or actual measured brightness of a task surface. Each photosensor may be controlled, for example, by closed and/or open loop algorithms that include measurements from one or more fields-of-view of the sensors. For example, each photosensor may look at a different part of the window wall and/or window covering. The information from these photosensors may be used to anticipate changes in brightness as the window covering travels across a window, indirectly measure the brightness coming through a portion of the window wall by looking at the brightness reflecting off an interior surface, measure brightness detected on the incident side of the window covering and/or to measure the brightness detected for any other field of view. The brightness control algorithms and/or other algorithms may also be configured to take into account whether any of the sensors are obstructed (for example, by a computer monitor, etc.). ASC 100 may also employ other sensors; for example, one or more motion sensors may be configured to employ stricter comfort control routines when the building spaces are occupied. That is, if a room's motion sensors detect a large number of people inside a room, ASC 100 may facilitate movement of the window coverings to provide greater shading and cooling of the room.

Moreover, ASC 100 may be configured to track radiation (e.g. solar rays and the like) on all glazing of a building including, for example, windows, skylights, and the like. For example, ASC 100 may track the angle of incidence of radiation; profile solar radiation and solar surface angles; measure the wavelength of radiation; track solar penetration based on the geometry of a window, skylight, or other opening; track solar heat gain and intensity for some or all windows in a building; track shadow information; track reflectance information; and track radiation for some or all orientations, i.e., 360 degrees around a building. ASC 100 may track radiation, log radiation information, and/or perform any other related operations or analysis in real time. Additionally, ASC 100 may utilize one or more of tracking information, sensor inputs, data logs, reactive algorithms, proactive algorithms, and the like to perform a microclimate analysis for a particular enclosed space.

In another exemplary embodiment of the present invention, the natural default operation of the motor controller in "Automatic Mode" may be governed by proactive control algorithms. When a reactive control algorithm interrupts operation of a proactive algorithm, the motor controller can be set up with specific conditions which determine how and when the motor controller can return to Automatic Mode. For example, this return to Automatic Mode may be based upon a configurable predetermined time, for example 12:00 A.M. In another embodiment, ASC 100 may return to Automatic Mode at a predetermined time interval (such as an hour later), when a predetermined condition has been reached (for example, when the brightness returns below a certain level through certain sensors), when the brightness detected is a configurable percentage less than the brightness detected when the motor was placed into brightness override, if the proactive algorithms require the window covering to further cover the shade, when fuzzy logic routines weigh the probability that the motor can move back into automatic mode (based on information regarding actual brightness measurements internally, actual brightness measurements externally, the profile angle of the sun, shadow conditions from adjacent buildings or structures on the given building based on the solar altitude and/or azimuth, reflectance conditions from external buildings or environmental conditions, and/or the like, or any combination of the same), and/or at any other manual and/or predetermined condition or control.

Motors 130 may be configured to control the movement of one or more window coverings. The window coverings are described in greater detail below. As used herein, motors 130 can include one or more motors and motor controllers. Motors 130 may comprise AC and/or DC motors and may be mounted within or in proximity with a window covering which is affixed by a window using mechanical brackets attaching to the building structure such that motors 130 enable the window covering to cover or reveal a portion of the window or glazing. As used herein, the term glazing refers to a glaze, glasswork, window, and/or the like. Motors 130 may be configured as any type of motor configured to open, close and/or move the window coverings at select, random, predetermined, increasing, decreasing, algorithmic and/or any other increments. For example, in one embodiment, motors 130 may be configured to move the window coverings in 1/16-inch increments in order to graduate the shade movements such that the operation of the shade is almost imperceptible to the occupant to minimize distraction. In another embodiment, motors 130 may be configured to move the window coverings in 1/8-inch increments. Motors 130 may also be configured to have each step and/or increment last a certain amount of time. Moreover, motors 130 may follow pre-set positions on an encoded motor. The time and/or settings of the increments may be any range of time and/or setting, for example, less than one second, one or more seconds, and/or multiple minutes, and/or a combination of settings programmed into the motor encoded, and/or the like. In one embodiment, each ⅛-inch increment of motors 130 may last five seconds. Motors 130 may be configured to move the window coverings at a virtually imperceptible rate to a structure's inhabitants. For example, ASC 100 may be configured to continually iterate motors 130 down the window wall in finite increments thus establishing thousands of intermediate stopping positions across a window pane. The increments may be consistent in span and time or may vary in span and/or time across the day and from day to day in order to optimize the comfort requirements of the space and further minimize abrupt window covering positioning transitions which may draw unnecessary attention from the occupants.

Motors 130 may vary between, for example, top-down, bottom-up, and even a dual motors 130 design known as fabric tensioning system (FTS) or motor/spring-roller combination. A bottom-up, sloping, angled, and/or horizontal design(s) may be configured to promote daylighting environments where light level through the top portion of the glass may be reflected or even skydomed deep into the space. Bottom-up window coverings naturally lend their application towards East facing facades where starting from sunrise the shade gradually moves up with the sun's rising altitude up to solar noon. Top-down designs may be configured to promote views whereby the penetration of the sun may be cutoff leaving a view through the lower portion of the glass. Top-down window coverings naturally lend their application towards the West facing facades where starting from solar noon the altitude of the sun drops the shade through sunset. Moreover, angled and/or sloping shading may be used to complement horizontal, angular and/or sloping windows in the facade.

ADI 105 may be configured with one or more electrical components configured to receive information from sensors 125 and/or to transmit information to CCS 110. In one embodiment, ADI 105 may be configured to receive millivolt signals from sensors 125. ADI 105 may additionally be configured to convert the signals from sensors 125 into digital information and/or to transmit the digital information to CCS 110.

ASC 100 may comprise one or more sensors 125 such as, for example, radiometers, photometers, ultraviolet sensors, infrared sensors, temperature sensors, motion sensors, wind sensors, and the like, in communication with ADI 105. In one embodiment, the more sensors 125 used in ASC 100, the more error protection (or reduction) for the system. "Radiometers" as used herein, may include traditional radiometers as well as other photo sensors configured to measure various segments of the solar spectrum, visible light spectrum photo sensors, infrared sensors, ultraviolet sensors, and the like. Sensors 125 may be located in any part of a structure. For example, sensors 125 may be located on the roof of a building, outside a window, inside a window, on a work surface, on an interior and/or exterior wall, and/or any other part of a structure. In one embodiment, sensors 125 are located in clear, unobstructed areas. Sensors 125 may be connected to ADI 105 in any manner through communication links 120. In one embodiment, sensors 125 may be connected to ADI 105 by low voltage wiring. In another embodiment, sensors 125 may be wirelessly connected to ADI 105.

Sensors 125 may additionally be configured to initialize and/or synchronize upon starting ASC 100. For example, various sensors 125, such as radiometers, may be configured to be initially set to zero, which may correspond to a cloudy sky condition regardless of the actual sky condition. Various sensors 125 may then be configured to detect sunlight for a user-defined amount of time, for example three minutes, in order to facilitate building a data file for the sensors. After the user-defined time has lapsed, sensors 125 may be synchronized with this new data file.

As discussed herein, communication links 120 may be configured as any type of communication links such as, for example, digital links, analog links, wireless links, optical links, radio frequency links, TCP/IP links, Bluetooth links, wire links, and the like, and/or any combination of the above. Communication links 120 may be long-range and/or short-range, and accordingly may enable remote and/or off-site communication. Moreover, communication links 120 may enable communication over any suitable distance and/or via any suitable communication medium. For example, in one embodiment, communication link 120 may be configured as an RS422 serial communication link.

ASC 100 may additionally be configured with one or more databases. Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), Base3 by Base3 systems, Paradox or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments of the present invention, the data can be stored without regard to a common format. However, in one exemplary embodiment of the present invention, the data set (e.g., BLOB) may be annotated in a standard manner when provided. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set (e.g., LOADED, INITIALIZED, READY, BLOCKED, REMOVABLE, or DELETED).

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on installation, initialization, user or the like. Furthermore, the security information may restrict/permit only certain actions such as accessing, modifying, and/or deleting data sets. In one example, the data set annotation indicates that only the data set owner or the user are permitted to delete a data set, various identified employees are permitted to access the data set for reading, and others are altogether excluded from accessing the data set. However, other access restriction parameters may also be used allowing various other employees to access a data set with various permission levels as appropriate.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

Any of the communications (e.g., communication link 120), inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stock-quotes/ge) and an IP address (123.45.6.78). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, "IT Web Services: A Roadmap for the Enterprise," (2003), hereby incorporated herein by reference.

One or more computerized systems and/or users may facilitate control of ASC 100. As used herein, a user may include an employer, an employee, a structure inhabitant, a building administrator, a computer, a software program, facilities maintenance personnel, and/or any other user and/or system. In one embodiment, a user connected to a LAN may access ASC 100 to facilitate movement of one or more window coverings. In another embodiment, ASC 100 may be configured to work with one or more third-party shade control systems, such as, for example, Draper's IntelliFlex© Control System. In addition and/or in an alternative embodiment, a Building Management System (BMS), a lighting system and/or an HVAC System may be configured to control and/or communicate with ASC 100 to facilitate optimum interior lighting and climate control. Further, ASC 100 may be configured to be remotely controlled and/or controllable by, for example, a service center. ASC 100 may be configured for both automated positioning of the window coverings and a manual override capability, either through a programmable user interface such as a computer or through a control user interface such as a switch. Additionally, ASC 100 may be configured to receive updated software and/or firmware programming via a remote communication link, such as communication link 120. ASC 100 may also be configured to transmit and/or receive information directed to operational reporting, system management reporting, troubleshooting, diagnostics, error reporting and the like via a remote communication link. Further, ASC 100 may be configured to transmit information generated by one or more sensors, such as motion sensors, wind sensors, radiometers, photosensors, temperature sensors, and the like, to a remote location via a remote communication link. Moreover, ASC 100 may be configured to transmit and/or receive any appropriate information via a remote communication link.

In one embodiment, an adaptive/proactive mode may be included. The adaptive/proactive mode may be configured to operate upon first installation for preset duration, whereby manual overrides of the automated settings may be logged and/or critical parameters identified which update the automated routines as to when a specific zone of shades should be deployed to a specific position. Averaging algorithms may be employed to minimize overcompensation. The manual override may be accomplished via a number of methodologies based on how accessible the capability is made to the occupant. In one embodiment, a manager or supervisor may be in charge of manually overriding the shade settings in order to mitigate issues where there may be a variance in comfort settings between individuals. However, override capability may be provided, for example, through switches, a telephone interface, a browser facility on the workstation, a PDA, touch screen, switch and/or by using a remote control. In open plan areas where multi-banded shades are employed, an infrared control may be employed so that the user points directly at the shadeband which needs to be operated. Thus, an infrared sensor may be applied by each band of a multibanded shade especially if the sensor is somewhat concealed. ASC 100 may additionally be configured with a preset timer wherein automatic operation of the window coverings will resume after a preset period after manual override of the system.

In another embodiment, ASC 100 is configured to facilitate control of one or more motor zones, shade bands and/or shade zone. Each motor zone may comprise one motor 130 for one to six shade bands. The shade zones include one or more motor zones and/or floor/elevation zones. For example, in a building that is twelve stories high, each tenant may have six floors. Each floor may comprise one shade zone, containing 3 motor zones. Each motor zone, in turn, may comprise 3 shade bands. A tenant on floors three and four may access ASC 100 to directly control at least one of the shade zones, motor zones and/or shade bands of its floors, without compromising or affecting the shade control of the other tenants.

In another embodiment, ASC 100 is configured with a "Shadow Program," to adapt to shadows caused by nearby buildings and/or environmental components, for example hills, mountains, and the like. For example, the shadow program uses a computer model of adjacent buildings and topography to model and characterize the shadows caused by surrounding nearby buildings on different parts of the object building. That is, ASC 100 may use the shadow program to raise the shades for all motor zones and/or shade zones that are in shadow from an adjacent building, from trees and mountains, from other physical conditions in addition to buildings, and/or from any other obstruction of any kind. This further facilitates maximization of daylight for the time the specific motor zones and/or shade zones are in shadow. When the shadow moves to other motor and/or shade zones (as the sun moves), ASC 100 may revert to the normal operating program protocols and override the shadow program. Thus ASC 100 can maximize natural interior daylighting and help reduce artificial interior lighting needs.

In another embodiment, ASC 100 is configured with a "Reflectance Program," to adapt to light reflected by reflective surfaces. As used herein, reflectance may be considered to be beamed luminance and/or illumination from a specular surface. Light may be reflected onto a building by a body of water, an expanse of snow, an expanse of sand, a glass surface of a building, a metal surface of a building, and the like. For example, the reflectance program uses a computer model of adjacent buildings and topography to model and characterize the light reflected by reflective surfaces onto different parts of the object building. That is, ASC 100 may use the reflectance program to move (lower and/or raise) one or more window coverings 255, for example a window covering 255 in a motor zone and/or shade zones that are in reflected light from any reflected light surface and/or reflected light source of any kind. In this manner, undesirable glare may be reduced. Moreover, certain types of reflected beamed and/or diffuse illumination may also provide additional daylighting, particularly when the light is directed toward a ceiling. When the reflected light moves to other motor and/or shade zones (e.g., as the sun moves), ASC 100 may revert to the normal operating program protocols and/or override the reflectance program. Thus, ASC 100 can maximize natural interior daylighting, help reduce artificial interior lighting needs, and/or reduce glare and other lighting conditions.

In a reflectance program, reflective objects may be defined by the computer as individual objects in a three-dimensional model. Moreover, each reflective object may have multiple reflective surfaces. Each reflective object may be partially or fully, enabled or disabled (i.e., partially or fully included in reflectance calculations or omitted from reflectance calculations). In this manner, if a particular reflective object (or any portion thereof) turns out, for example, to be less reflective than anticipated and/or insufficiently reflective to be of concern at a particular brightness threshold, then that particular reflective object may be fully or partially removed from reflectance calculations without affecting reflectance calculations for other reflective objects. Moreover, a reflectance program utilized by ASC 100 may be activated or inactivated, as desired. For example, the reflectance program may be configured to be activated if external conditions are considered to be sunny, and the reflectance program may be configured to be inactive if external conditions are considered to be overcast and/or cloudy.

Moreover, a reflectance program utilized by ASC 100 may be configured with information regarding the nature of each reflective object (e.g., dimensions, surface characteristics, compositions of materials, etc). In this manner, ASC 100 may respond appropriately to various types of reflected light. For example, in the case of a reflection from a building, the resulting apparent position of the sun has a positive altitude. Therefore, the reflected solar ray is coming downward onto the building in question, just as a direct solar ray is always coming down. Thus, in response, ASC 100 may utilize one or more solar penetration algorithms in order to move a window covering incrementally downward to at least partially block the incoming reflected solar ray. In another example, in the case of reflectance from a body of water such as a pond, the resulting apparent position of the sun has a negative altitude (e.g., the reflected light appears to originate from a sun shining up from below the horizon). In response, ASC 100 may move a window covering to a fully closed position to at least partially block the incoming reflected ray. However, ASC 100 may take any desired action and/or may move a window covering to any suitable location and/or into any appropriate configuration responsive to reflectance information, and ASC 100 is not limited to the examples given.

In certain embodiments, ASC 100 may be configured with a minimum calculated reflectance duration threshold before responding to calculated reflectance information generated by a reflectance program. For example, a particular calculated portion of reflected light may be cast onto a particular surface only for a limited amount of time, for example one minute. Thus, movement of a window covering responsive to this reflected light may be unnecessary. Moreover, movement of the window covering may not be able to be completed before the reflected light has ceased. Thus, in an embodiment, ASC 100 is configured to respond to calculated reflectance information only if the calculated reflected light will continuously impinge on a window for one (1) minute or longer. In another embodiment, ASC 100 is configured to respond to calculated reflectance information only if the calculated reflected light will continuously impinge upon a window for five (5) minutes or longer. Moreover, ASC 100 may be configured to respond to calculated reflectance information wherein the calculated reflected light will continuously impinge upon a window for any desired length of time.

Additionally, ASC 100 may be configured with various reflectance response times, for example advance and/or delay periods, associated with calculated reflectance information. For example, ASC 100 may be configured to move a window covering before a calculated reflected light ray will impinge on a window, for example one (1) minute before a calculated reflected light ray will impinge on the window. ASC 100 may also be configured to move a window covering after a calculated reflected light ray has impinged on a window, for example ten (10) seconds after a calculated reflected light ray has impinged on a window. Moreover, ASC 100 may be configured with any appropriate advance and/or delay periods responsive to calculated reflectance information, as desired. Additionally, the advance and/or delay periods may vary from zone to zone. Thus, ASC 100 may have a first reflectance response time associated with a first zone, a second reflectance response time associated with a second zone, and so on, and the reflectance response times associated with each zone may differ. Additionally, a user may update the reflectance response time associated with a particular zone, as desired. ASC 100 may thus be configured with any number of zone reflectance response times, default reflectance response times, user-input reflectance response times, and the like.

In various embodiments, a reflectance program utilized by ASC 100 may be configured to model primary reflectance information and/or higher order reflectance information, e.g., information regarding dispersion reflections. The reflection of light off a non-ideal surface will generate a primary reflection (a first order reflection) and higher order dispersion reflections. In general, second order dispersion reflections and/or higher order dispersion reflections may be modeled provided that sufficient information regarding the associated reflective surface is available (for example, information regarding material characteristics, surface conditions, and/or the like). Information regarding primary reflections from a reflective surface, as well as information regarding higher order reflections from the reflective surface, may be stored in a database associated with the reflectance program. This stored information may be utilized by the reflectance program to calculate the appearance of various reflected light rays. However, due to various factors (for example, absorption at the reflective surface, absorption and/or scattering due to suspended particles in the air, and/or the like) the calculated reflected light rays may in fact be unobtrusive or even undetectable to a human observer where the calculated reflected light is calculated to fall. Thus, no change in a position of a window covering may be needed to maintain visual comfort. ASC 100 may therefore ignore a calculated reflected light ray in order to avoid "ghosting"—i.e., movement of window coverings for no apparent reason to a human observer.

In general, a ray of light may be reflected any number of times (e.g., once, twice, three times, and so on). A reflectance program may therefore model repeated reflections in order to account for reflected light on a particular target surface. For example, sunlight may fall on a first building with a reflective surface. The light directly reflected off this first building has been reflected one time; thus, this light may be considered once reflected light. The once reflected light may travel across the street and contact a second reflective building. After being reflected from the second building, the once reflected light becomes twice reflected light. The twice reflected light may be further reflected to become thrice reflected light, and so on. Because modeling multiple reflection interactions for a particular light ray results in increased computational load, larger data sets, and other data, a reflectance program may be configured to model a predetermined maximum number of reflections for a particular light ray in order to achieve a desired degree of accuracy regarding reflected light within a desired computation time. For example, in an exemplary embodiment, a reflectance program may model only once reflected light (e.g., direct reflections only). In other embodiments, a reflectance program may model once and twice reflected light. Moreover, a reflectance program may model reflected light which has been reflected off any number of reflective surfaces, as desired.

Additionally, because surfaces are typically not perfectly reflective, reflected light is less intense than direct light. Thus, the intensity of light decreases each time it is reflected. Therefore, a reflectance program utilized by ASC 100 may limit the maximum number of calculated reflections for a particular light ray in order to generate calculated reflectance information. For example, a thrice reflected light ray may be calculated to fall on a target window. However, due to absorption caused by the various intermediate reflective surfaces, the intensity of the thrice reflected light ray may be very low, and may in fact be unobtrusive or even undetectable to a human observer. Thus, no change in a position of a window covering may be needed to maintain visual comfort. ASC 100 may therefore ignore the calculated thrice reflected light ray in order to avoid ghosting. Additionally, ASC 100 may calculate reflectance information for only a small number of reflections interactions (for example, once reflected light or twice reflected light) in order to avoid ghosting.

In various embodiments, ASC 100 may utilize one or more data tables, for example a window table, an elevation table, a floor table, a building table, a shadow table, a reflective surface table, and the like. A window table may comprise information associated with one or more windows of a building (e.g., location information, index information, and the like). An elevation table may comprise information associated with one or more elevations of a building (e.g., location information, index information, and the like). A floor table may comprise information associated with floor of a building (e.g., floor number, height from ground, and the like). A building table may comprise information about a building, for example, orientation (e.g., compass direction), 3-D coordinate information, and the like. A shadow table may comprise information associated with one or more objects which may at least partially block sunlight from striking a building, for example, the height of a mountain, the dimensions of an adjacent building, and the like. A reflective surfaces table may comprise information associated with one or more reflective surfaces, for example, 3-D coordinate information, and the like. In this manner, ASC 100 may calculate desired information, for example, when sunlight may be reflected from one or more reflective surfaces onto one or more locations on a building, when a portion of a building may be in a shadow cast by an adjacent building, and the like.

ASC 100 solar tracking algorithms may be configured to assess and analyze the position of the glazing (i.e., vertical, horizontal, sloped in any direction) to determine the solar heat gain and solar penetration. ASC 100 may also use solar tracking algorithms to determine if there are shadows and/or reflections on the glazing, window wall and/or facade from the building's own architectural features. These architectural features include, but are not limited to, windows, skylights, bodies of water, overhangs, fins, louvers, and/or light shelves. Thus, if the building is shaded by, and/or in reflected light from, any of these architectural features, the window covering may be adjusted accordingly using ASC 100 algorithms.

Figure 5:
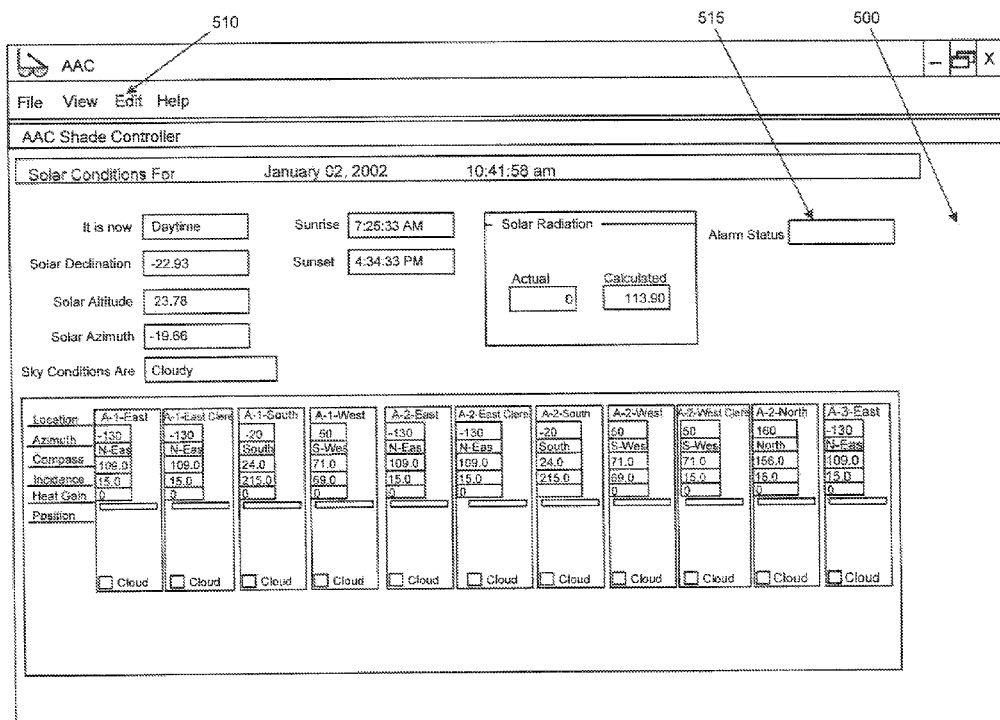
FIG. 5 shows a screen shot of an exemplary user interface (e.g. view of SolarTrac software) in accordance with the present invention.

ASC 100 may be configured with one or more user interfaces to facilitate user access and control. For example, as illustrated in an exemplary screen shot of a user interface 500 in FIG. 5, a user interface may include a variety of clickable links, pull down menus 510, fill-in boxes 515, and the like. User interface 500 may be used for accessing and/or defining the wide variety of ASC 100 information used to control the shading of a building, including, for example, geodesic coordinates of a building; the floor plan of the building; universal shade system commands (e.g., add shades up, down, etc.); event logging; the actual and calculated solar position; the actual and calculated solar angle; the actual and calculated solar radiation; the actual and calculated solar penetration angle and/or depth; the actual and/or calculated solar intensity; the measured brightness and veiling glare across the height of the window wall or a portion of the window (e.g. the vision panel) and/or on any facades, task surfaces and/or floors; shadow information; reflectance information; the current time; solar declination; solar altitude; solar azimuth; sky conditions; sunrise and sunset time; location of the various radiometers zones; the azimuth or surface orientation of each zone; the compass reading of each zone; the brightness at the window zones; the incidence angle of the sun striking the glass in each zone; the window covering positions for each zone; the heat gain; and/or any other parameters used or defined by the ASC 100 components, the users, the radiometers, the light sensors, the temperature sensors, and the like.

ASC 100 may also be configured to generate one or more reports based on any of the ASC 100 parameters as described above. For example, ASC 100 can generate daylighting reports based on floor plans, power usage, event log data, sensor locations, shade positions, shade movements, shadow information, reflectance information, the relationship of sensor data to shade movements and/or to manual over-rides and/or the like. The reporting feature may also allow users to analyze historical data detail. For example, historical data regarding shade movement in conjunction with at least one of sky condition, brightness sensor data, shadow information, reflectance information, and the like, may allow users to continually optimize the system over time. As another example, data for a particular period can be compared from one year to the next, providing an opportunity to optimize the system in ways that have never been possible or practical with existing systems.

ASC 100 may be configured to operate in automatic mode (based upon preset window covering movements) and/or reactive modes (based upon readings from one or more sensors 125). For example, an array of one or more visible light spectrum photo sensors may be implemented in reactive mode where they are oriented on the roof towards the horizon. The photo sensors may be used to qualify and/or quantify the sky conditions, for example at sunrise and/or sunset. Further, the photo sensors may be configured inside the structure to detect the amount of visible light within a structure. ASC 100 may further communicate with one or more artificial lighting systems to optimize the visible lighting within a structure based upon the photo sensor readings.

Figure 2A:
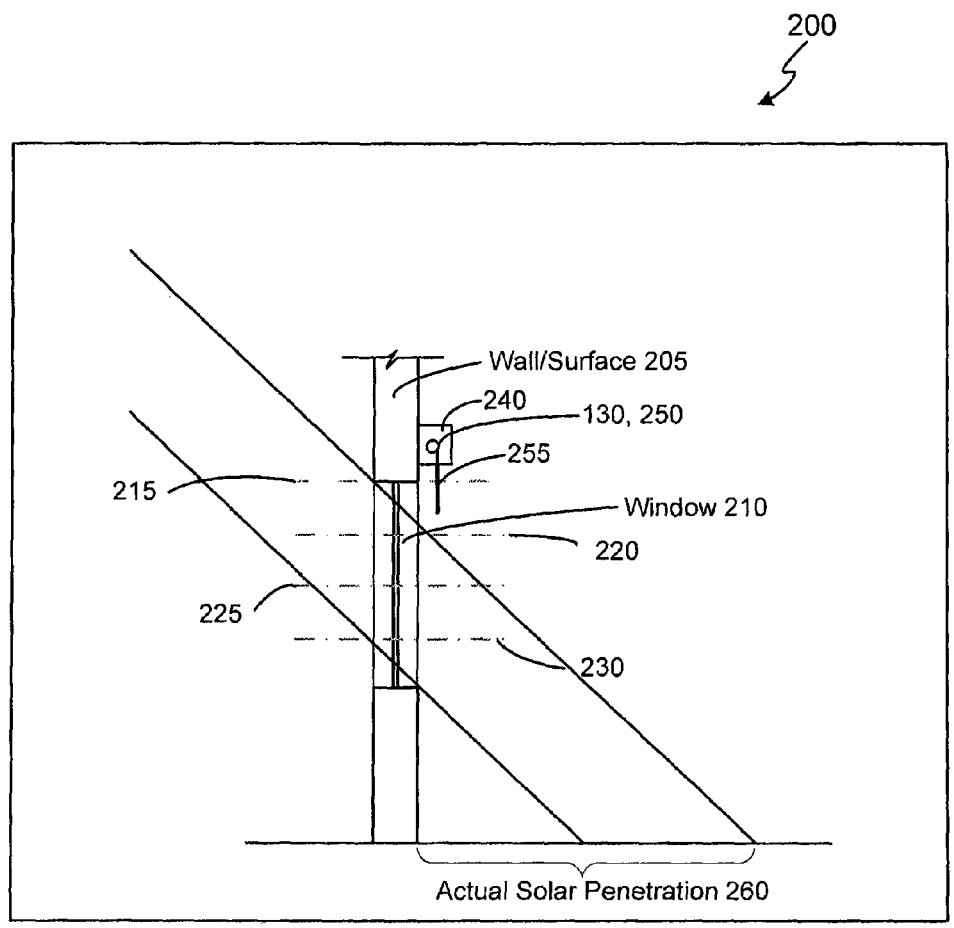
FIG. 2A shows a schematic illustration of an exemplary window system with a window covering retracted in accordance with the present invention.
Figure 2B:
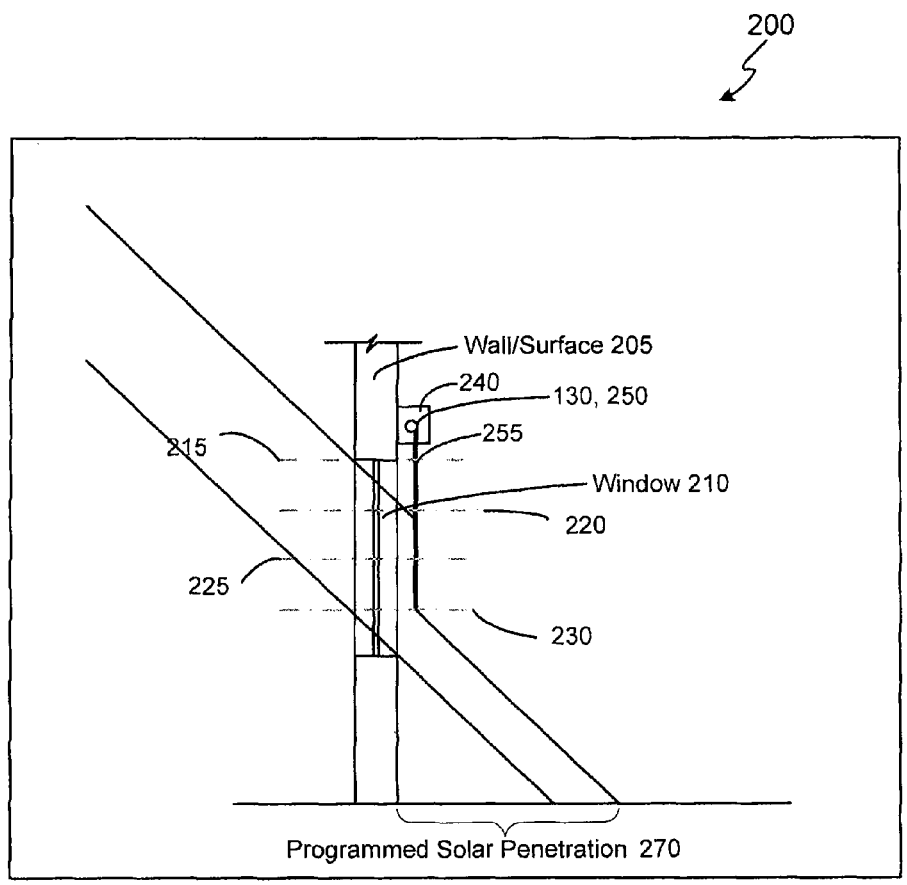
FIG. 2B shows a schematic illustration of an exemplary window system with a window covering extended in accordance with the present invention.

With reference to an exemplary diagram illustrated in FIG. 2A, an embodiment of a window system 200 is depicted. Window system 200 comprises a structural surface 205 configured with one or more windows 210. A housing 240 may be connected to structural surface 205. Housing 240 may comprise one or more motors 130 and/or opening devices 250 configured for adjusting one or more window coverings 255. Based on factors including, for example, time of day, time of year, window geometry, building geometry, building environment, and the like, a solar ray may achieve an actual solar penetration 260 into an enclosed space through window system 200. With reference now to FIG. 2B, one or more window coverings 255 may be extended in order to partially and/or fully block and/or obstruct the solar ray in order to limit an actual solar penetration to a programmed solar penetration 270.

With continued reference to FIGS. 2A and 2B, structural surface 205 may comprise a wall, a steel reinforcement beam, a ceiling, a floor, and/or any other structural surface or component. Windows 210 may comprise any type of window, including, for example, skylights and/or any other type of openings configured for sunlight penetration. Housing 240 may be configured as any type of housing, including, for example, ceramic pipes, hardware housings, plastic housings, and/or any other type of housing. Opening devices 250 may comprise pull cords, roller bars, drawstrings, ties, pulleys, levers, and/or any other type of device configured to facilitate adjusting, opening, closing, and/or varying window coverings 255.

Window coverings 255 may be any type of covering for a window for facilitating control of solar glare, brightness and veiling glare, contrasting brightness and veiling glare, illuminance ratios, solar heat gain or loss, UV exposure, uniformity of design and/or for providing a better interior environment for the occupants of a structure supporting increased productivity. Window coverings 255 may be any type of covering for a window, such as, for example, blinds, drapes, shades, Venetian blinds, vertical blinds, adjustable louvers or panels, fabric coverings with and/or without low E coatings, mesh, mesh coverings, window slats, metallic coverings and/or the like.

Window coverings 255 may also comprise two or more different fabrics or types of coverings to achieve optimum shading. For example, window coverings 255 may be configured with both fabric and window slats. Furthermore, an exemplary embodiment may employ a dual window covering system whereby two window coverings 255 of different types are employed to optimize the shading performance under two different modes of operation. For instance, under clear sky conditions a darker fabric color may face the interior of the building (weave permitting a brighter surface to the exterior of the building to reflect incident energy back out of the building) to minimize reflections and glare thus promoting a view to the outside while reducing brightness and veiling glare and thermal load on the space. Alternatively, during cloudy conditions a brighter fabric facing the interior may be deployed to positively reflect interior brightness and veiling glare back into the space thus minimizing gloom to promote productivity.

Window coverings 255 may also be configured to be aesthetically pleasing. For example, window coverings 255 may be adorned with various decorations, colors, textures, logos, pictures, and/or other features to provide aesthetic benefits. In one embodiment, window coverings 255 are configured with aesthetic features on both sides of the coverings. In another embodiment, only one side of coverings 255 are adorned. Window coverings 255 may also be configured with reflective surfaces, light-absorbent surfaces, wind resistance material, rain resistance material, and/or any other type of surface and/or resistance. While FIG. 2 depicts window coverings 255 configured within a structure, window coverings 255 may be configured on the outside of a structure, both inside and outside a structure, between two window panes and/or the like. Motors 130 and/or opening device 250 may be configured to facilitate adjusting window coverings 255 to one or more positions along window 210 and/or structural surface 205. For example, as depicted in FIGS. 2A and 2B, motor 130 and/or opening device 250 may be configured to move window coverings 255 into any number of stop positions, such as into four different stop positions 215, 220, 225, and 230.

Moreover, window coverings 255 may be configured to be moved independently. For example, window coverings 255 associated with a single window and/or set of windows may comprise a series of adjustable fins or louvers. Control of the upper fins may be separate from control of the lower fins. Thus, light from lower fins may be directed at a first angle to protect people and daylighting, while light from upper fins may be directed at a second angle to maximize illumination on the ceiling and into the space behind the fins. In another example, window coverings 255 associated with a single window and/or set of windows may comprise roller screens and/or horizontal blinds associated with a lower portion of a single window and/or set of windows, and a series of adjustable fins or louvers associated with an upper portion of a single window and/or set of windows. Control of the lower roller screens and/or lower horizontal blinds may be separate from the upper louvers. As before, the lower roller screens and/or lower horizontal blinds may protect people and daylighting, while the upper louvers may direct light toward the ceiling to maximize illumination on the ceiling and into the space behind the louvers.

Further, window coverings 255 may comprise any number of individual components, such as multiple shade tiers. For example, window coverings 255 associated with a single window and/or set of windows may comprise multiple horizontal and/or vertical tiers, for example three shade tiers—a bottom tier, a middle tier, and a top tier. Control of each shade tier may be separate from control of each other shade tier. Thus, for example, the top shade tier may be moved down, then the middle tier may be moved down, and then the lower tier may be moved down, and vice versa. Moreover, multiple shades may be configured to act in concert. For example, a 300 foot high window may be covered by three 100 foot shades, each of which are controlled individually. However, the three 100 foot shades may be configured to move in a concerted manner so as to provide continuous or nearly continuous deployment of shading from top to bottom. Thus, multiple shade tiers may be moved in any sequence and/or into any configuration suitable to facilitate control of one or more parameters such as, for example, interior brightness, interior temperature, solar heat gain, and the like.

Stop positions 215, 220, 225, and 230 may be determined based on the sky type. That is, CCS 110 may be configured to run one or more programs to automatically control the movement of the motorized window coverings 255 unless a user chooses to manually override the control of some or all of the coverings 255. One or more programs may be configured to move window coverings 255 to shade positions 215, 220, 225, and 230 depending on a variety of factors, including, for example, latitude, the time of day, the time of year, the measured solar radiation intensity, the orientation of window 210, the extent of solar penetration 235, shadow information, reflectance information, and/or any other user-defined modifiers. Additionally, window coverings 255 may be configured to specially operate under a severe weather mode, such as, for example, during hurricanes, tornadoes, and the like. While FIGS. 2A and 2B depict four different stop positions, ASC 100 may comprise any number of shade and/or stop positions for facilitating automated shade control.

For example, shading on a building may cause a number of effects, including, for example, reduced heat gain, a variation in the shading coefficient, reduced visible light transmission to as low as 0-1%, lowered "U" value with the reduced conductive heat flow from "hot to cold" (for example, reduced heat flow into the building in summer), and/or reduced heat flow through the glazing in winter. Window coverings 255 may be configured with lower "U" values to facilitate bringing the surface temperature of the inner surface of window coverings 255 closer to the room temperature. That is, to facilitate making the inner surface of window coverings 255 i.e. cooler than the glazing in the summer and warmer than the glazing in the winter. As a result, window coverings 255 may help occupants near the window wall to not sense the warmer surface of the glass and therefore feel more comfortable in the summer and require less air conditioning. Similarly, window coverings 255 may help during the winter months by helping occupants maintain body heat while sitting adjacent to the cooler glass, and thus require lower interior heating temperatures. The net effect is to facilitate a reduction in energy usage inside the building by minimizing room temperature modifications.

Figure 4:
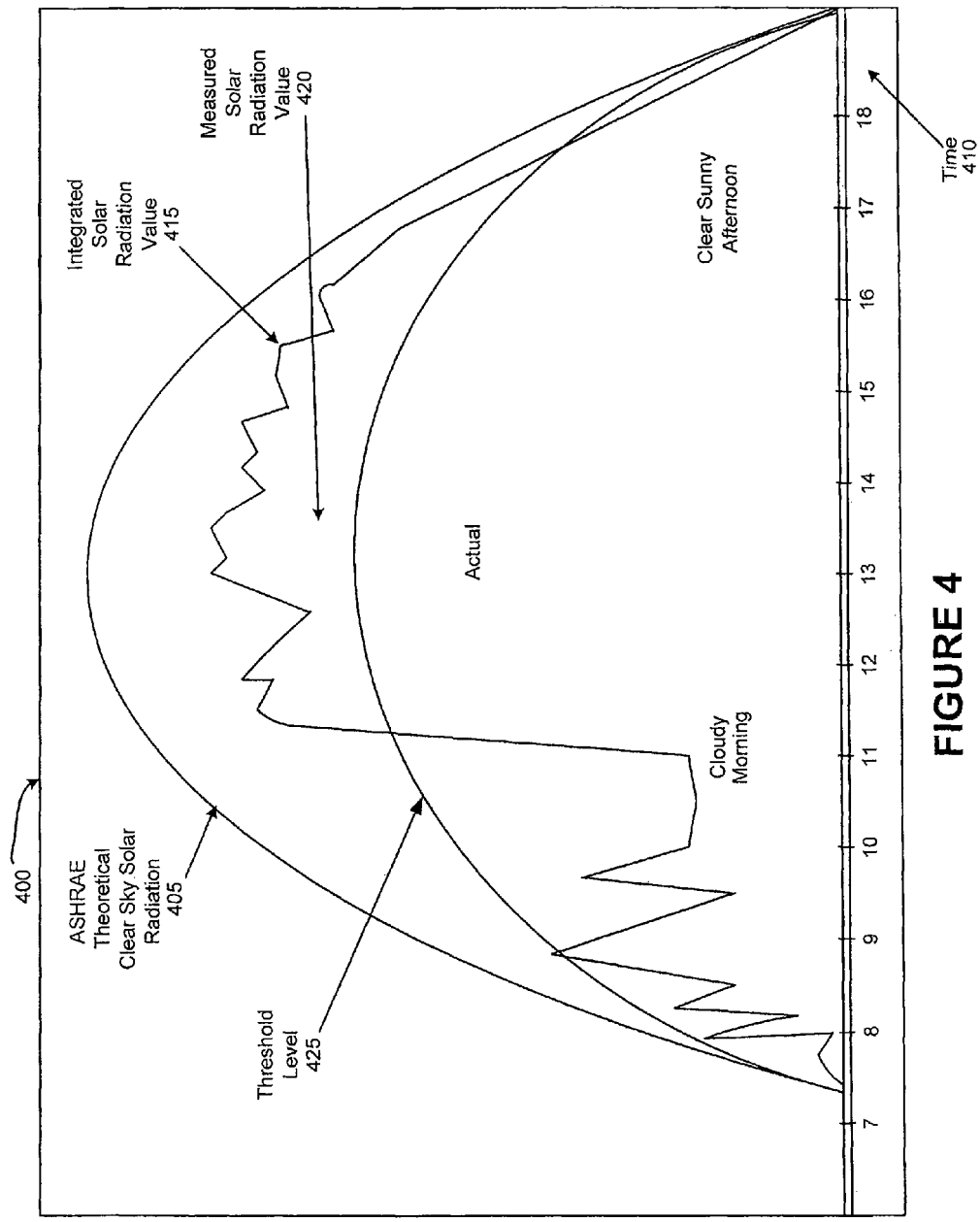
FIG. 4 depicts an exemplary ASHRAE model in accordance with the present invention.

ASC 100 may be configured to operate in a variety of sky modes to facilitate movement of window coverings 255 for optimum interior lighting. The sky modes include, for example, overcast mode, night mode, clear sky mode, partly cloudy mode, sunrise mode, sunset mode and/or any other user configured operating mode. ASC 100 may be configured to use clear sky solar algorithms developed by the American Society of Heating, Refrigerating and Air-Conditioning Engineers (ASHRAE) and/or any other clear sky solar algorithms known or used to calculate and quantify sky models. For example, and with reference to FIG. 4, the ASHRAE model 400 may include a curve of the ASHRAE theoretical clear sky solar radiation 405 as a function of time 410 and the integrated solar radiation value 415. Time 410 depicts the time from sunrise to sunset. The measured solar radiation values 420 may then be plotted to show the measured values to the calculated clear sky values. ASHRAE model 400 may be used to facilitate tracking sky conditions throughout the day. CCS 110 may be configured to draw a new ASHRAE model 400 every hour, every day, and/or at any other user-defined time interval. Additionally, ASC 100 may be configured to compare measured solar radiation values 420 to threshold level 425. Threshold level 425 may represent a percentage of ASHRAE calculated clear sky solar radiation 405. When measured solar radiation values 420 exceed threshold level 425, ASC 100 may be configured to operate in a first sky mode, such as clear sky mode. Similarly, when measured solar radiation values 420 do not exceed threshold level 425, ASC may be configured to operate in a second sky mode, such as overcast mode.

ASC 100 may use the ASHRAE clear sky models in conjunction with one or more inputs from one or more sensors 125, such as radiometers, to measure the instantaneous solar radiation levels within a structure and/or to determine the sky mode. CCS 110 may be configured to send commands to motors 130 and/or window openings 250 to facilitate adjustment of the position of window coverings 255 in accordance with the sky mode, the solar heat gain into the structure, the solar penetration into the structure, ambient illumination and/or any other user defined criteria.

For example, in one embodiment, the ASHRAE model can be used to provide a reduced heat gain which is measured by the shading coefficient factor of a fabric which varies by density, weave and color. In addition the window covering, when extended over the glass, may add a "U" Value (reciprocal to "R" value) and reduce conductive heat gain (i.e. reduction in temperature transfer by conduction.)

Figure 3:
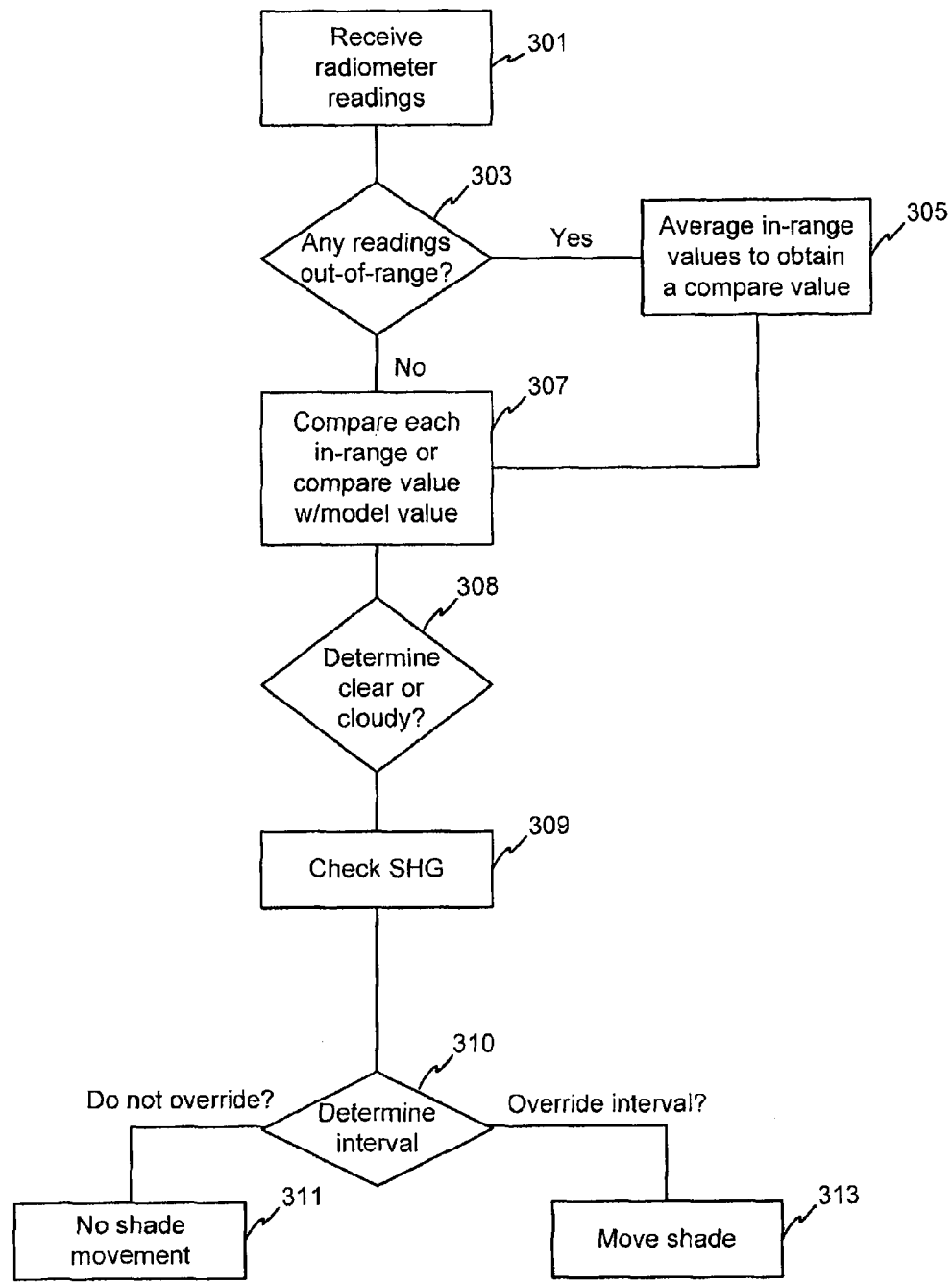
FIG. 3 illustrates a flow diagram of an exemplary method for automated shade control in accordance with the present invention.

For example, with reference to a flowchart exemplified in FIG. 3, CCS 110 may be configured to receive solar radiation readings from one or more sensors 125, such as radiometers (step 301). CCS 110 may then determine whether any of the sensor readings are out-of-range, thus indicating an error (step 303). If any of the readings/values are out-of-range, CCS 110 may be configured to average the readings of the in-range sensors to obtain a compare value (step 305) for comparison with an ASHRAE clear sky solar radiation model (step 307). If all readings are in-range, then each sensor value may be compared to a theoretical solar radiation value predicted by the ASHRAE clear sky solar radiation model (step 307). That is, each sensor 125 may have a reading that indicates a definable deviation in percentage from the ASHRAE clear sky theoretical value. Thus, if the sensor readings are all a certain percentage from the theoretical value, it can be determined that the conditions are cloudy or clear (step 308).

CCS 110 may also be configured to calculate and/or incorporate the solar heat gain (SHG) period for one or more zones (step 309). By calculating the SHG, CCS 110 may communicate with one or more sun sensors configured within ASC 100. The sun sensors may be located on the windows, in the interior space, on the exterior of a structure and/or at any other location to facilitate measuring the solar penetration and/or solar radiation and/or heat gain at that location. CCS 110 may be configured to compare the current position of one or more window coverings 255 to positions based on the most recent calculated SHG to determine whether window coverings 255 should be moved. CCS 110 may additionally determine the time of the last movement of window coverings 255 to determine if another movement is needed. For example, if the user-specified minimum time interval has not yet elapsed, then CCS 110 may be configured to ignore the latest SHG and not move window coverings 255 (step 311). Alternately, CCS 110 may be configured to override the user-defined time interval for window coverings 255 movements. Thus, CCS 110 may facilitate movement of coverings 255 to correspond to the latest SHG value (step 313).

While FIG. 3 depicts the movement of window coverings 255 in a specific manner with specific steps, any number of these steps may be used to facilitate movement of window coverings 255. Further, while a certain order of steps is presented, any of the steps may occur in any order. Further still, while the method of FIG. 3 anticipates using sensors and/or the SHG to facilitate movement of window coverings 255, a variety of additional and/or alternative factors may be used by CCS 110 to facilitate movement, such as, for example, the calculated solar radiation intensity incident on each zone, user requirements for light pollutions, structural insulation factors, light uniformity requirements, seasonal requirements, and the like.

For example, ASC 100 may be configured to employ a variety of iterations for the movement of window coverings 255. In one embodiment, ASC 100 may be configured to use a Variable Allowable Solar Penetration Program (VASPP), wherein ASC 100 may be configured to apply different maximum solar penetration settings based on the time of the year. These solar penetrations may be configured to vary some of the operation of ASC 100 because of the variations in sun angles during the course of a year. For example, in the wintertime (in North America), the sun will be at a lower angle and thus sensors 125, such as radiometers and/or any other sensors used with the present invention, may detect maximum BTUs, and there may be high solar penetration into a structure. That is, the brightness and veiling glare on the south and east orientations of the building will have substantial sunshine and brightness on the window wall for the winter months, for extended periods of the day from at least 10 am to 2 pm. Under these situations, the allowable solar penetration setting of ASC 100 may be set lower to facilitate more protection due to the lower solar angles and higher brightness and veiling glare levels across the facade of the structure. In another embodiment, a shade cloth with a medium to medium dark value grey to the out side and a light medium grey to the interior at 2-3% openness, depending on the interior color may be used to control brightness, maximize view and allow for the more open fabric.

In contrast, in the summertime, the sun will be at a higher angle minimizing BTU load, thus the allowable solar penetration for ASC 100 may be set higher to facilitate viewing during clear sky conditions. For example, the north, northwest and northeast orientations generally have much lower solar loads year round but do have the orb of the sun in the early morning and the late afternoon in summer, and may have brightness levels that exceed 2000 NITS; 5500 Lux (current window brightness default value) at various times of the year and day however for shorter periods. These high solar intensities are most prevalent during the three month period centered on June 21, the summer solstice. To combat this, ASC 100 may be configured so that the higher solar penetration does not present a problem with light reaching an uncomfortable position with regard to interior surfaces. Under these conditions, the VASPP may be configured with routine changes in solar penetration throughout the year, for example, by month or by changes in season (i.e., by the seasonal solstices). A minimum BTU load ("go"/"no-go") may additionally be employed in ASC 100 whereby movement of window coverings 255 may not commence unless the BTU load on the facade of a structure is above a certain preset level.

The VASPP may also be configured to adjust the solar penetration based on the solar load on the glass. For example, if the south facing elevation has a stairwell, it may have a different solar penetration requirement than the office area and different from the corner at the west elevation. Light may filter up and down the stairwell causing shades to move asymmetrically. As a result, window coverings 255 may be lowered or raised based upon the sun angle and solar heat gain levels (which may or may not be confirmed by active sensors before making adjustments). The VASPP may also be configured with an internal brightness and veiling glare sensor to facilitate fine-tuning of the levels of window coverings 255. Additionally, there may be one or more pre-adjusted set position points of window coverings 255 based on a day/brightness analysis. The day/brightness analysis may factor in any one or more of, for example, estimated BTU loads, sky conditions, daylight times, veiling glare, averages from light sensors and/or any other relevant algorithms and/or data.

In another aspect of the present invention, one or more optical photo sensors may be located in the interior, exterior or within a structure. The photo sensors may facilitate daylight/brightness sensing and averaging for reactive protection of excessive brightness and veiling glare due to reflecting surfaces from the surrounding cityscape or urban landscape. These bright reflective surfaces may include but are not limited to, reflective glass on adjacent buildings, water surfaces, sand, snow, and/or any other bright surfaces exterior to the building which under specific solar conditions will send visually debilitating reflective light into the building.

In one exemplary method, the sensors may be located about 30-36 inches from the floor and about 6-inches from the fabric to emulate the field of view (FOV) from a desk top. One or more additional sensors may detect light by looking at the light through window coverings 255 while it moves through the various stop positions. The FOV sensors and the additional sensors may be averaged to determine the daylight levels. If the value of daylight levels is greater than a default value, ASC 100 may enter a brightness override mode and move window coverings 255 to another position. If the daylight levels do not exceed the default value, ASC 100 may not enter a brightness override mode and thus not move window coverings 255. Afterwards, ASC 100 may be configured for fine-tuning the illuminance levels of the window wall by averaging the shaded and unshaded portion of the window. Fine tuning may be used to adjust the field of view from a desk top in accordance with the season, interior, exterior, and furniture considerations and/or task and personal considerations.

In another embodiment, ASC 100 may be configured with about 6-10 photo sensors positioned in the following exemplary locations: (1) one photo sensor looking at the fabric at about 3 feet 9 inches off the floor and about 3 inches from the fabric at a south elevation; (2) one sensor looking at the glass at about 3 feet 6 inches off the floor and about 3 inches from the glass at a south elevation; (3) one sensor looking at the dry wall at a south elevation; (4) one sensor mounted on a desktop looking at the ceiling; (5) one sensor mounted outside the structure looking south; (6) one sensor mounted outside the structure looking west; (7) one sensor about 3 inches from the center of the extended window coverings 255 when window coverings 255 is about 25% closed; (8) one sensor about 3 inches from the center of the extended window coverings 255 when coverings 255 is about 25% to 50% closed; (9) one sensor about 3 inches from the center of the glass; and (10) one sensor about 3 inches from the middle of the lower section of a window, approximately 18 inches off the floor. In one embodiment, ASC 100 may average the readings from, for example, sensors 10 and 7 described above. If the average is above a default value and the ASC has not moved window coverings 255, coverings 255 may be moved to an about 25% closed position. Next, ASC 100 may average the readings from sensors 10 and 8 to determine whether window coverings 255 should be moved again.

In another embodiment, ASC 100 may be configured to average the reading from sensors 2 and 1 above. ASC 100 may use the average of these two sensors to determine a "go" or "no go" value. That is, if the glass sensor (sensor 2) senses too much light and ASC 100 has not moved window coverings 255, coverings 255 will be moved to a first position. ASC 100 will then average the glass sensor (sensor 2) and the sensor looking only at light through the fabric (sensor 1). If this average value is greater then a user-defined default value, window coverings 255 may be moved to the next position and this process will be repeated. If ASC 100 has previously dictated a window covering position based upon the solar geometry and sky conditions (as described above), ASC 100 may be configured to override this positioning to lower and/or raise window coverings 255. If the average light levels on the two sensors drop below the default value, the positioning from the solar geometry and sky conditions will take over.

In another similar embodiment, a series of photo sensors may be employed discreetly behind an available structural member such as a column or staircase whereby, for example, these sensors may be located approximately 3 to 5 feet off the fabric and glass surfaces. Four sensors may be positioned across the height of the window wall corresponding in mounting height between each of potentially five alignment positions (including full up and full down). These sensors may even serve a temporary purpose whereby the levels detected on these sensors may be mapped over a certain time period either to existing ceiling mounted photo sensors already installed to help control the brightness and veiling glare of the lighting system in the space or even to externally mounted photo sensors in order to ultimately minimize the resources required to instrument the entire building.

In another exemplary embodiment, ASC 100 may be configured with one or more additional light sensors that look at a window wall. The sensors may be configured to continuously detect and report the light levels as the shades move down the window. ASC 100 may use these light levels to compute the luminous value of the entire window walls, and it may use these values to facilitate adjustment of the shades. In one embodiment, three different sensors are positioned to detect light from the window wall. In another embodiment, two different sensors are positioned to detect light from the window wall. A first sensor may be positioned to view the window shade at a position corresponding to window coverings 255 being about 25% closed, and a second sensor may be positioned to view the window at a position of about 75% closed. The sensors may be used to optimize light threshold, differentiate between artificial and natural light, and/or utilize a brightness and veiling glare sensor to protect against overcompensation for brightness and veiling glare. This method may also employ a solar geometry override option. That is, if the light values drop to a default value, the movement of window coverings 255 may be controlled by solar geometric position instead of light levels.

Additionally, ASC 100 may be configured with one or more sensors looking at a dry interior wall. The sensors may detect interior illuminance and compare this value with the average illuminance of one or more sensors looking at the window wall. This ratio may be used to determine the positioning of window coverings 255 by causing coverings 255 to move up or down in order to achieve an interior lighting ratio of dry wall illuminance to window wall illuminance ranging from about, for example, 9:1 to 15:1. Other industry standard configurations employ illuminance ratios of 3:1 regarding a 30 degree cone of view (central field of vision) around the VDU (Video Display Unit), 10:1 regarding a 90 degree cone of view around the VDU and a ratio of 30:1 regarding back wall illuminance to the VDU. Sensors may be placed strategically throughout the room environment in order to bring data to the controller to support these types of algorithms.

In yet another embodiment, ASC 100 may also be configured to accommodate transparent window facades following multi-story stair sections which tend to promote a "clerestory-like" condition down a stairway (i.e., the upper portion of a wall that contains windows supplies natural light to a building). ASC 100 may be configured to use the solar tracking algorithm to consider a double-height facade to ensure that the penetration angle of the sun is properly accounted for and controlled. For example, the geometry of a window (including details such as height, overhangs, fins, position in the window wall, and/or the like) may be programmed into ASC 100, which then calculates the impact of a solar ray on the window. The photo sensor placement and algorithms may be placed to help detect and overcome any overriding brightness and veiling glare originating from reflections from light penetration through the upper floors.

In another embodiment, ASC 100 may employ any combination of photo sensors located on the exterior of the building and/or the interior space to detect uncomfortable light levels during sunrise and sunset which override the window covering settings established by the solar tracking under these conditions.

In another embodiment, ASC 100 may be configured to detect bright overcast days and establish the appropriate window covering settings under these conditions. Bright overcast days tend to have a uniform brightness in the east and west while the zenith tends to be approximately one-third the brightness of the horizons which is contrary to a bright, clear day where the zenith is typically three times brighter than the horizon. Exterior sensors 125, such as photo sensors and/or radiometers, may be configured to detect these conditions. Under these conditions, the window coverings (top-down) may be pulled down to just below the desk height in order to promote proper illumination at the desk surface while providing a view to the cityscape. Internal photo sensors may also be helpful in determining this condition and may allow the window coverings to come down to only 50% and yet preserve the brightness and veiling glare comfort derived by illuminance ratios in the space. For example, various sensors 125, such as photosensors and/or radiometers, may be placed on all sides and/or roof surfaces of a building. For example, a rectangular building with a flat roof may have various sensors 125 placed on all four sides of the building and on the roof. Thus, ASC 110 may detect directional sunlighting on a clear day. Additionally, ASC 110 may detect a bright overcast condition, wherein sunlighting may have a relatively diffuse, uniform luminous character. Accordingly, ASC 110 may implement various algorithms in order to control excessive sky brightness. Moreover, ASC 100 may comprise any various sensors 125 placed on all sides and/or facades of a building which has many orientations due to the shape of the building and/or the directions a building facade faces.

In various embodiments, overriding sensors 125 may also be strategically placed on each floor and connected to ASC 100 to help detect glare reflections from the urban landscape as well as to handle changes made in the urban landscape and ensure the proper setting for the shades to maintain visual comfort. These sensors 125 may also be employed to help reduce veiling glare and brightness problems at night in urban settings where minimal signage thresholds imposed on surrounding buildings and the instrumented building may pose unusual lighting conditions which may be difficult to model. In some cases, these situations may be static whereby a sensor 125 may be unnecessary and a timer may simply be employed to handle these conditions based on occupancy which is information that may be provided from the building's lighting system. Moreover, a reflectance algorithm may be employed by ASC 100 in order to account for reflected light, including reflected sunlight, reflected artificial light from nearby sources, and the like.

Figure 6:
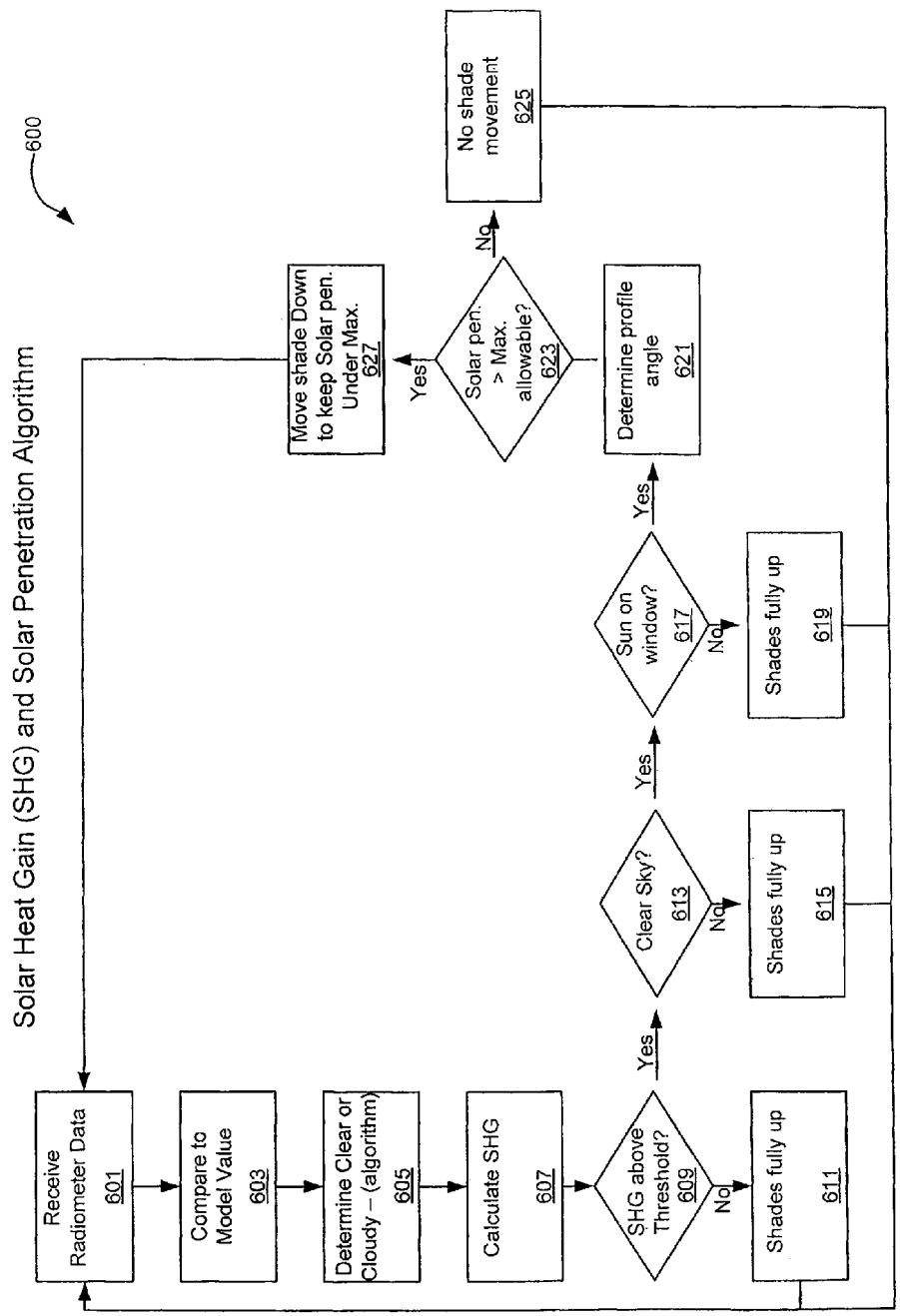
FIG. 6 illustrates a flowchart of exemplary solar heat gain and solar penetration sensing and reaction in accordance with the present invention.

In accordance with an exemplary embodiment, and with reference now to FIG. 6, ASC 100 may be configured to implement an algorithm, such as algorithm 600, incorporating at least one of solar heat gain information, sky condition information, shadow information, reflectance information, solar profile information and/or solar penetration information. CCS 110 may be configured to receive information from one or more sensors 125, such as radiometers or other total solar measuring sensors (step 601). CSS 110 may then compare the received information to one or more model values (step 603). Based on the results of the comparison, CCS 110 may determine if the sky conditions are cloudy or clear (step 605). CCS 110 may then calculate the solar heat gain for the interior space in question (step 607). CCS 110 may then evaluate if the solar heat gain is above a desired threshold (step 609). If the solar heat gain is below a desired threshold, for example, one or more window coverings may be moved at least partially toward to a fully opened position (step 611). Correspondingly, if one or more window coverings are already in a fully opened position, the window coverings may not be moved.

Continuing to reference FIG. 6, if the solar heat gain is above a desired threshold, CCS 110 may use sky condition information determined in step 605 to evaluate the need to move one or more window coverings (step 613). If the sky conditions are determined to be overcast, one or more window coverings may be moved at least partially toward a fully opened position and/or kept in a fully opened position (step 615). If the sky conditions are determined to be clear, CCS 110 may use at least one of shadow information, reflectance information, and the like, to determine if one or more windows in question are exposed to sunlight (step 617). If the one or more windows in question are not exposed to sunlight, the one or more window coverings may be moved at least partially toward a fully opened position and/or kept in a fully opened position (step 619). If the one or more windows in question are exposed to sunlight, CCS 110 may calculate and/or measure the profile angle and/or incident angle of the sunlight (step 621).

With continued reference to FIG. 6, based on information including but not limited to solar profile angle, solar incident angle, window geometry, building features, position of one or more window coverings, shadow information, reflectance information, sky conditions and/or the like, CCS 110 may then calculate the current solar penetration. If the current solar penetration is below a threshold solar penetration (step 623), one or more windows coverings may be moved at least partially toward a fully open position and/or kept in a fully opened position (step 625). Alternatively, if the current solar penetration is above a threshold solar penetration, CCS 110 may issue instructions configured to move one or more window coverings at least partway toward a fully closed position in order to reduce the current solar penetration below the threshold solar penetration (step 627).

Moreover, in certain embodiments, CCS 110 and/or ASC 100 may be configured with a delay period before responding to information received from a sensor (for example, reflectance information, brightness information, shadow information, and/or the like). For example, certain reflected light, such as light reflected from a moving vehicle, may be cast onto a particular surface only for a limited amount of time. Thus, movement of a window covering responsive to this reflected light may be unnecessary. Moreover, movement of the window covering may not be able to be completed before the reflected light has ceased. Additionally, responding to repeated transient reflected light rays (e.g., reflections from a procession of vehicles, from the unsettled surface of a body of water, and the like) may result in near-constant window covering movement in an attempt to keep up with the ever-changing lighting conditions. In another example, a certain shadow condition may only persist for a brief period of time, for example a shadow condition caused by the sun being momentarily obscured by a cloud. Therefore, movement of a window covering responsive to this change in lighting may be unnecessary.

Thus, in an embodiment, ASC 100 and/or CCS 110 is configured to respond to information from a sensor only after the sensor has reported a changed lighting condition (e.g., the appearance of reflected light, the appearance of shadow, and/or the like) persisting for five (5) seconds. In another embodiment, ASC 100 and/or CCS 110 is configured to respond to information from a sensor only after the sensor has reported a changed lighting condition persisting for ten (10) seconds. Moreover, ASC 100 may have a first response time associated with a first zone, a second response time associated with a second zone, and so on, and the response times associated with each zone may differ. Additionally, a user may update the response time associated with a particular zone, as desired. ASC 100 may thus be configured with any number of zone response times, default response times, user-input response times, and the like.

Figure 7:
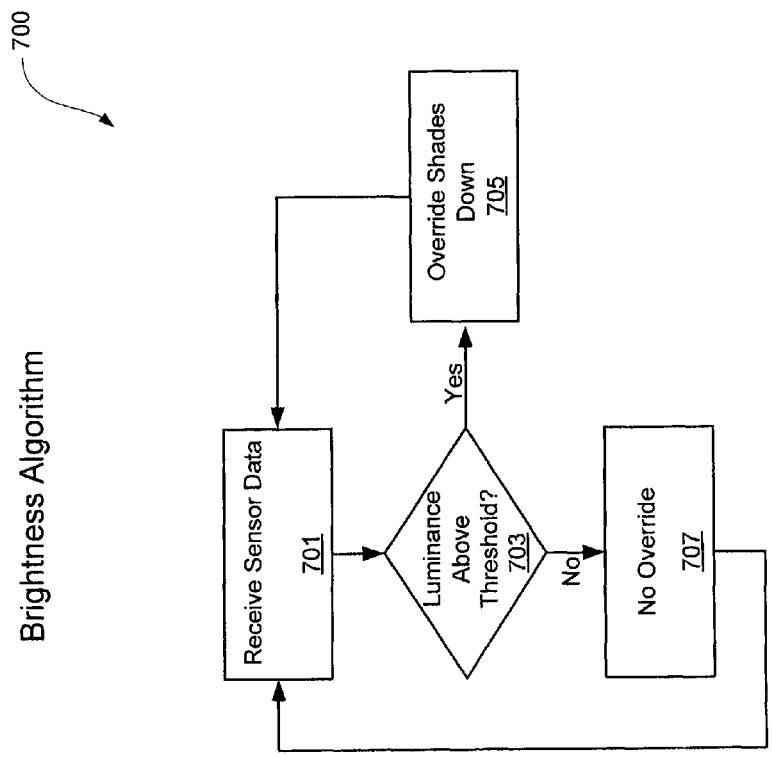
FIG. 7 illustrates a flowchart of exemplary brightness sensing and reaction in accordance with the present invention.

Turning now to FIG. 7, and in accordance with an exemplary embodiment, ASC 100 may be configured to implement an algorithm, such as algorithm 700, incorporating brightness information. CCS 110 may be configured to receive brightness information from one or more photosensors. CCS 110 may also be configured to receive information from other sensors, such as radiometers, ultraviolet sensors, infrared sensors, and the like (step 701). CCS 110 may then evaluate the current luminance, and compare the current luminance to a threshold luminance (step 703). If the current luminance exceeds a threshold luminance, CCS 110 may implement a brightness override, and one or more window coverings may be moved at least partway toward a fully closed position (step 705). If the current luminance does not exceed a threshold luminance, CCS 110 may not implement a brightness override, and one or more window coverings may be left in their current positions and/or moved at least partway toward a fully open position (step 707).

Moreover, ASC 100 may be configured to utilize one or more external sensors, for example visible light sensors, in order to implement a brightness override. In this manner, individual building zone brightness sensors may be reduced and/or eliminated, leading to significant cost savings, as the building zone brightness sensors may be costly to purchase and/or install, and difficult to calibrate and/or maintain. Moreover, ASC 100 may be configured to utilize one or more interior photo sensors in conjunction with one or more external photo sensors in order to determine if a brightness override is needed for any of the motor zones in a particular building.

Figure 8:
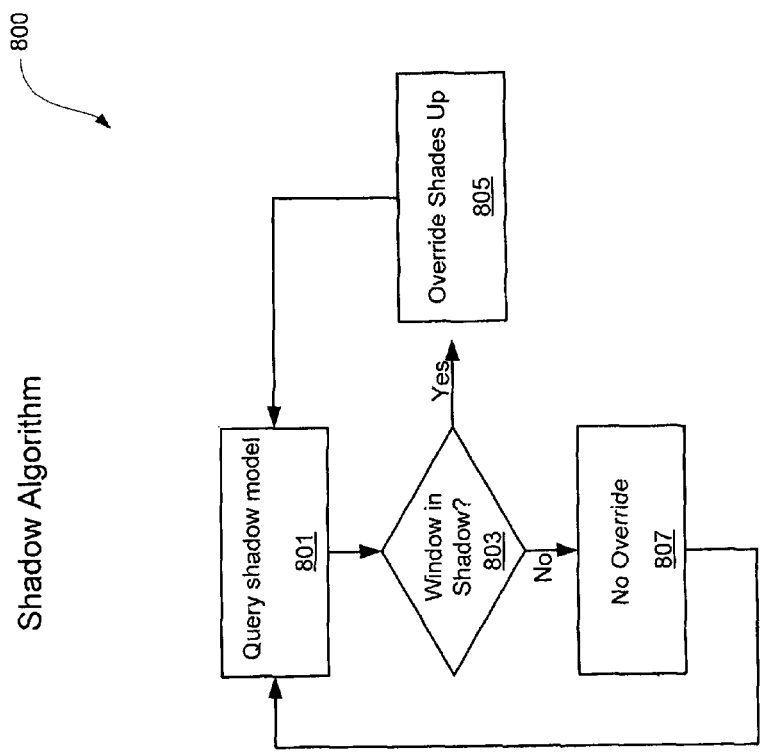
FIG. 8 illustrates a flowchart of exemplary shadow modeling and reaction in accordance with the present invention.

With reference now to FIG. 8, and in accordance with an exemplary embodiment, ASC 100 may be configured to implement an algorithm, such as algorithm 800, incorporating shadow information. CCS 110 may be configured to query a shadow model (step 801) which may contain information regarding shadowing of a building due to the environment, such as nearby structures, landscape features (e.g., mountains, hills, and the like), and other items which may cast a shade onto a building at any point during a day and/or year. CCS 110 may then evaluate the current shadow information to determine if one or more windows and/or motor zones are in a shadowed condition (step 803). If the one or more windows and/or motor zones are shadowed, CCS 110 may implement a shadow override, and one or more window coverings may be moved at least partway toward a fully open position (step 805). If one or more windows and/or motor zones are not shadowed, CCS 110 may not implement a shadow override, and one or more window coverings may be left in their current positions and/or moved at least partway towards a fully closed position (step 807). Additionally, CCS 110 may be configured to not implement a shadow override if one or more windows and/or motor zones will be shadowed for a limited period of time, such as between about one minute and thirty minutes. Moreover, CCS 110 may be configured to not implement a shadow override if one or more windows and/or motor zones will be shadowed for any desired length of time.

In various exemplary embodiments, CCS 110 may be configured to implement a shadow override when ASC 100 is operating in clear sky mode. In other exemplary embodiments, CCS 110 may be configured to implement a shadow override when ASC 100 observes measured solar radiation equal to or in excess of 75 percent of ASHRAE calculated clear sky solar radiation. Moreover, in certain exemplary embodiments, CCS 110 may be overridden by a bright overcast sky mode calculation wherein one or more window coverings are moved to a predetermined position, for example 50% of fully open.

Figure 9:
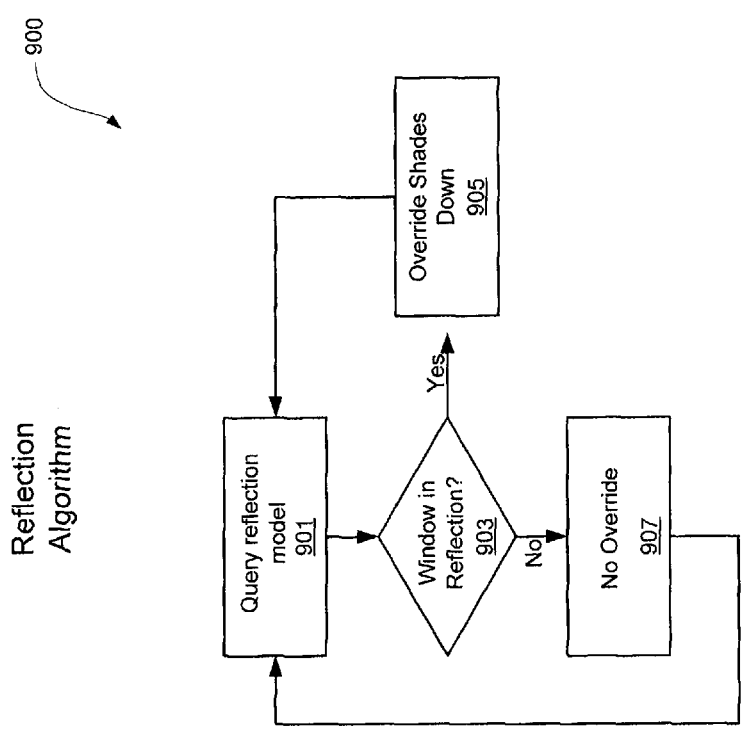
FIG. 9 illustrates a flowchart of exemplary reflectance modeling and reaction in accordance with the present invention.

With reference now to FIG. 9, and in accordance with an exemplary embodiment, ASC 100 may be configured to implement an algorithm (e.g., algorithm 900) incorporating reflectance information. CCS 110 may be configured to query a reflectance model (step 901) which may contain information regarding light reflected onto a building due to the environment, for example by reflective components of nearby structures, landscape features (e.g., water, sand, snow, and the like), and other items which may reflect light onto a building at any point during any time period (e.g., day, season, year). CCS 110 may then evaluate the current reflectance information to determine if one or more windows and/or motor zones are in a reflectance condition (step 903). If reflected light is cast on at least a portion of one or more windows and/or motor zones, the window and/or motor zone may be deemed to be in a reflectance condition. Moreover, if only a subset of the windows comprising a motor zone is in a reflectance condition, that motor zone may be considered to be in a reflectance condition.

However, ASC 100 may be configured to assess each window in a motor zone and determine if each window is in a non-reflectance condition (e.g., no reflected light is falling on the window), a full reflectance condition (e.g., reflected light is falling on all portions of the window), a partial reflectance condition (e.g., reflected light is falling on only a portion of the window), and the like. ASC 100 may thus consider a window and/or motor zone to be in a reflectance condition based on a user preference. For example, in an embodiment, ASC 100 is configured to consider a window to be in a reflectance condition when the window is fully or partially in reflected light. In other embodiments, ASC 100 is configured to consider a window to be in a reflectance condition when the window is fully in reflected light. In still other embodiments, ASC 100 is configured to consider a window to be in a reflectance condition when at least 10% of the window is in reflected light. Moreover, ASC 100 may consider a window to be in a reflectance condition by using any appropriate thresholds, measurements, and/or the like.

If the one or more windows and/or motor zones are in reflected light, CCS 110 may implement a reflectance override, and one or more window coverings may be moved at least partway toward a fully closed position (step 905). If one or more windows and/or motor zones are not in reflected light, CCS 110 may not implement a reflectance override, and one or more window coverings may be left in their current positions and/or moved at least partway towards a fully open position (step 907). Additionally, CCS 110 may be configured to not implement a reflectance override in response to one or more windows and/or motor zones being in reflected light for a limited period of time, such as between about one minute and thirty minutes. Moreover, CCS 110 may be configured to not implement a reflectance override if one or more windows and/or motor zones will be in reflected light for any desired length of time.

ASC 100 may further be configured to enable and/or disable a reflectance override based on any suitable criteria, for example: the current ASHRAE and/or radiometer sky data readings (i.e., full spectrum information); the sky data readings from one or more photometers (i.e., oriented in any suitable manner, for example east-facing, west-facing, zenith-oriented, and/or the like); a combination of radiometer and photometer data readings; and/or the like. Moreover, data from one or more photometers may be utilized by ASC 100 in order to calculate the need for a reflectance override. However, data from one or more radiometers may also be utilized. Further, in various embodiments, ASC 100 may be configured to implement various averaging algorithms, thresholds, and the like in order to reduce the need for repeated movements or "cycling" of one or more window coverings 255.

In various exemplary embodiments, CCS 110 may be configured to implement a reflectance override when ASC 100 is operating in clear sky mode. However, CCS 110 may also implement a reflection override, for example responsive to radiometer sky data, when ASC is operating in any mode. In other exemplary embodiments, CCS 110 may be configured to implement a reflectance override when ASC 100 observes measured solar radiation equal to or in excess of a particular threshold, for example 75 percent of ASHRAE calculated clear sky solar radiation. Further, the threshold utilized for implementing a reflectance override may be related to the threshold utilized for determining a sky condition (clear, cloudy, bright overcast, partly sunny, and the like). For example, in an embodiment, the threshold utilized for implementing a reflectance override may be 5% greater than the threshold for determining a clear sky condition. Additionally, when radiometers and photometers are employed, CCS 110 may be configured to implement a reflectance override only when ASC 100 is operating under a particular mode or modes (clear sky, partly clear sky, and so forth). CCS 110 may thus assess data received from one or more photometers in order to see if the ambient lighting level is above a particular threshold. Moreover, in certain exemplary embodiments, CCS 110 may be overridden by a bright overcast sky mode calculation wherein one or more window coverings are moved to a predetermined position, for example 50% of fully open.

Figure 10A:
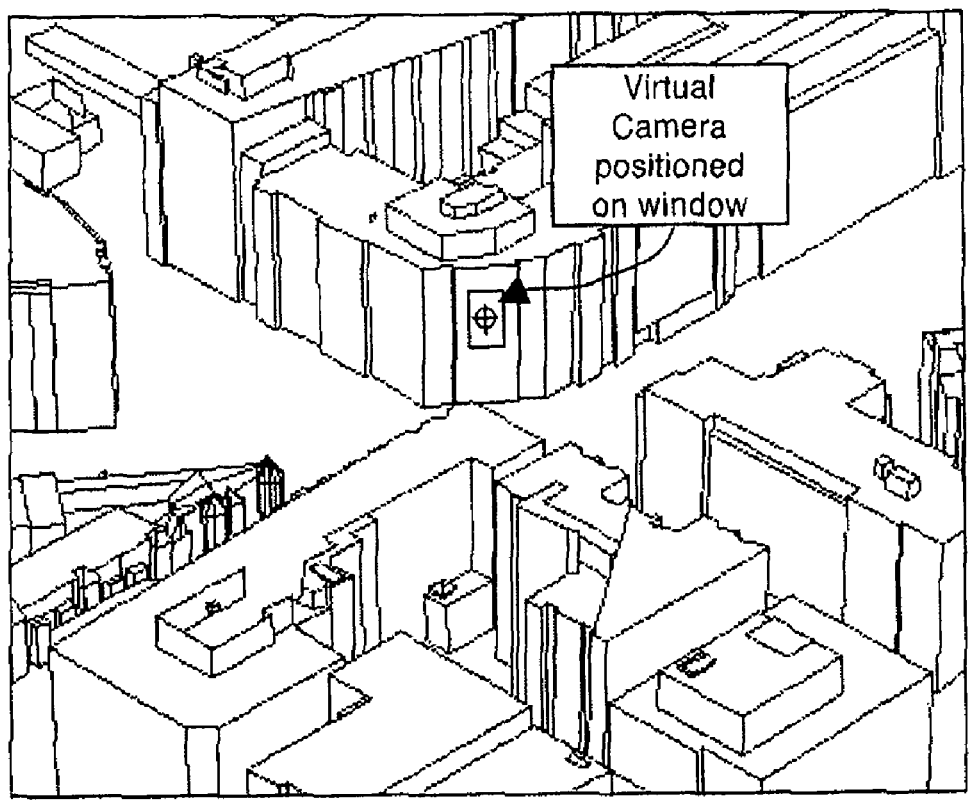
FIGS. 10A-10E illustrate reflectance modeling in accordance with the present invention.
Figure 10B:
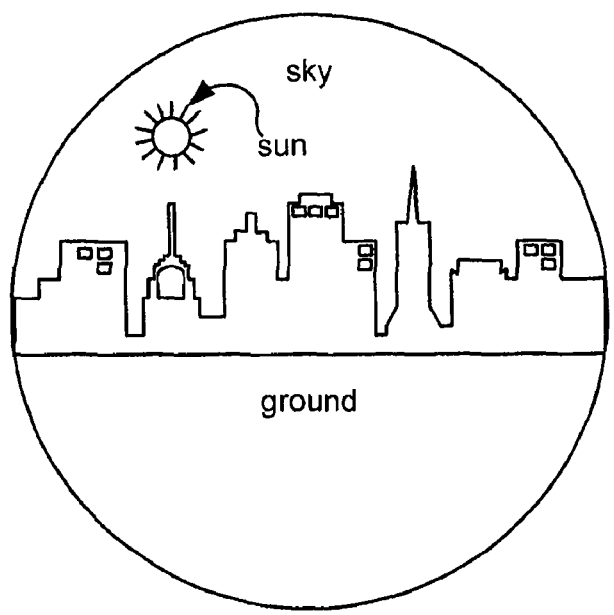

With reference now to FIGS. 10A to 10D, in an exemplary embodiment, a reflectance program is configured to determine if reflected light falls on a particular location on a building. A three-dimensional computer model of the building is constructed. As depicted in FIG. 10A, a virtual camera is placed at the location on the building model where reflectance is to be assessed. A three-dimensional computer model of surrounding objects (other buildings, bodies of water, and the like) is constructed. With this information, the virtual camera constructs a 180 degree hemispherical projection of all objects visible in the direction the camera is facing, as depicted in FIG. 10B. The position of the sun is plotted in the hemispherical projection. Depending on the position of the sun and the properties of the objects visible to the camera (e.g., reflective, non-reflective, and the like), the virtual camera location may be in a direct sunlight condition, shaded condition, a reflectance condition, and the like. For example, if the position of the sun is within the boundary of another building, and the building is not reflective, the building will cast a shadow onto the virtual camera location, resulting in a shaded condition.

Figure 10C:
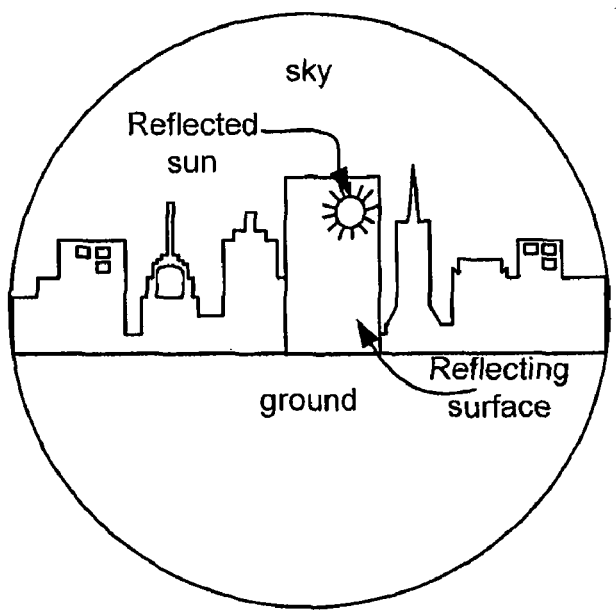

With reference now to FIG. 10C, in accordance with an exemplary embodiment, one or more reflecting surfaces are plotted in the hemispherical projection. Information about reflecting surfaces may be stored in a reflector table. For example, a reflector table may contain information characterizing the dimensions of the reflecting surface, the location of a reflecting surface, the azimuth of a reflecting surface, the altitude of a reflecting surface, and/or the like. Information from the reflector table may be utilized to plot one or more reflecting surfaces in the hemispherical projection. Moreover, for a defined sun position in the sky (azimuth and altitude), the sun may be reflected onto the virtual camera location by one or more of the reflecting surfaces. The reflected sun (and associated sunlight) has a position (azimuth and altitude) different from the actual sun location in the sky. The reflected sun is plotted on the hemispherical projection.

Figure 10D:
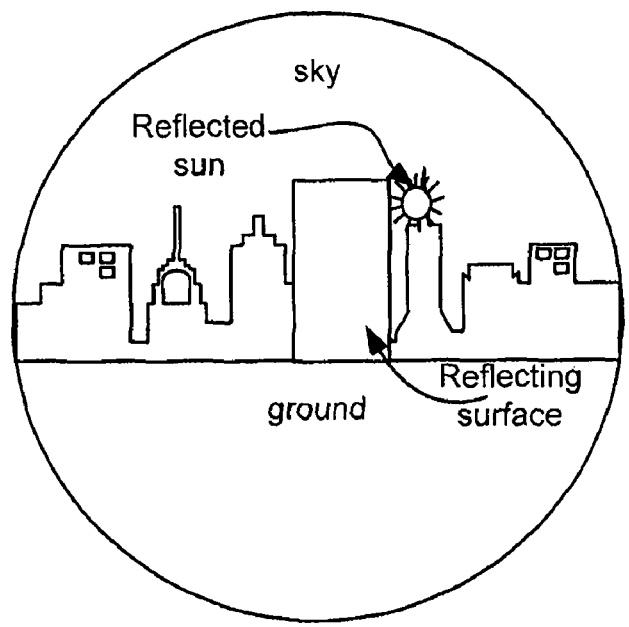

At this point, the reflected sun may fall within the bounds of at least one reflecting surface. If this occurs, the reflected sunlight will fall on the virtual camera, as illustrated in FIG. 10C. Alternately, the reflected sun may fall outside the bounds of any reflecting surface. In this event, no reflected sunlight falls on the virtual camera, as illustrated in FIG. 10D.

Figure 10E:
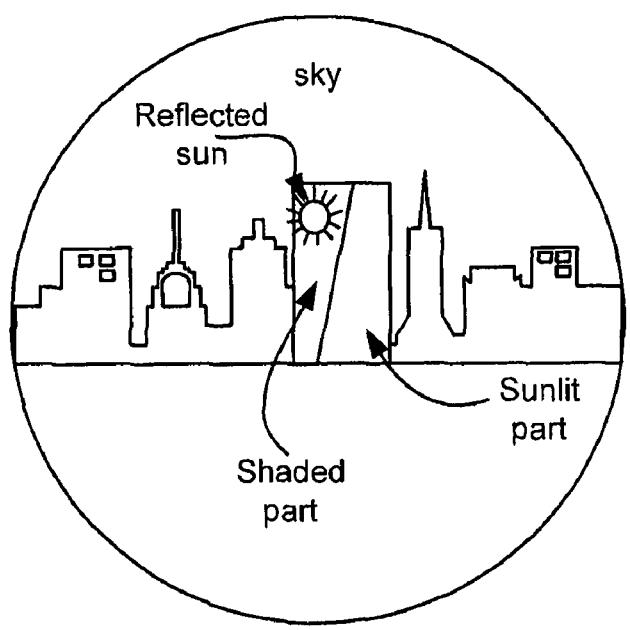

Moreover, as illustrated by FIG. 10E, a reflecting surface may itself be shaded. A reflectance program may test the location of the reflected sun to determine if the reflected sun is in the shaded or sunlit portion of a reflecting surface. If the reflected sun is on the sunlit part of the reflecting surface, the reflected sunlight will fall on the virtual camera. If the reflected sun is on the shaded part of the reflecting surface, no reflected sunlight will fall on the virtual camera. Moreover, a reflectance program may be configured to account for and properly model "self-shading", wherein a portion of a building casts a shadow onto another portion of the building, and "self-reflectance", wherein a portion of a building reflects light onto another portion of the building. In this manner, a reflectance algorithm may model, plot, determine, and/or otherwise calculate the presence and/or absence of specular reflections and/or diffuse reflections at any desired location. Moreover, reflectance information for complex building shapes (e.g., cruciform buildings, pinwheel-shaped buildings, irregular buildings, and/or the like) may thus be modeled, and one or more window coverings 255 may be moved accordingly.

In various embodiments, CCS 110 may occasionally calculate conflicting movement information for a motor zone (for example, via use one or more of algorithm 600, algorithm 700, algorithm 800, algorithm 900, and/or the like). For example, a first portion of a motor zone may be in a shadowed condition, resulting in CCS 110 calculating a need to move at least one window covering toward a fully open position in accordance with algorithm 800. At the same time, a second portion of a motor zone may be in a reflectance condition—resulting in CCS 110 calculating a need to move at least one window covering toward a fully closed position in accordance with algorithm 900. In order to maintain brightness comfort, CCS 110 may be configured to allow the results of algorithm 900 to take priority over the results of algorithm 800. Stated another way, CCS 110 may be configured to give reflectance priority over shadow.

CCS 110 may be configured to execute one or more algorithms, including but not limited to algorithms 600, 700, 800, and/or 900, on a continuous and/or real-time basis, on a scheduled basis (every ten seconds, every minute, every ten minutes, every hour, and the like), on an interrupt basis (responsive to information received from one or more sensors, responsive to input received from a user, responsive to a remote command, and the like), and/or any combination of the above. Moreover, CCS 110 may be configured to execute an algorithm, such as algorithm 600, independently. CCS 110 may also be configured to execute an algorithm, such as algorithm 600, simultaneously with one or more additional algorithms, such as algorithm 700, algorithm 800, algorithm 900, and the like. Further, CCS 110 may be configured to turn off and/or otherwise disable use of one or more algorithms, such as algorithm 800, as desired, for example when conditions are overcast, cloudy, and the like. Moreover, CCS 110 may be configured to implement and/or execute any suitable number of algorithms at any suitable times in order to achieve a desired effect on an enclosed space.

As mentioned herein, ASC 100 may be configured to communicate with a Building Management System (BMS), a lighting system and/or a HVAC system to facilitate optimum interior lighting and climate control. Moreover, ASC 100 may communicate with a BMS for any suitable reason, for example, responsive to overheating of a zone, responsive to safety considerations, responsive to instructions from a system operator, and/or the like. For example, ASC 100 may be used to determine the solar load on a structure and communicate this information to the BMS. The BMS, in turn, may use this information to proactively and/or reactively set the interior temperatures and/or light levels throughout the structure to avoid having to expend excessive energy required to mitigate already uncomfortable levels, and to avoid a lag time in response to temperature changes on a building. For example, in typical systems, a BMS responds to the heat load on a building once that heat load has been registered. Because changing interior environment of a building takes significant energy, time and resources, there is a substantial lag in response time by a BMS to that heat load gain. In contrast, the proactive and reactive algorithms and systems of ASC 100 are configured to actively communicate to BMS regarding changes in brightness, solar angle, heat, and the like, such that BMS can proactively adjust the interior environment before any uncomfortable heat load/etc. on a building is actually registered.

Furthermore, ASC 100 may be given the priority to optimize the window covering settings based on energy management and personal comfort criteria after which the lighting system and HVAC system may be used to supplement the existing condition where the available natural daylight condition may be inadequate to meet the comfort requirements. Communication with a lighting system may be imperative to help minimize the required photo sensor resources where possible and to help minimize situations where closed loop sensors for both the shading and lighting control algorithms may be affected by each other. For example, based on information from one or more brightness sensors, ASC 100 may move at least one window covering into a first position. After ASC 100 has moved a window covering, a lighting system may then be activated and select appropriate dimming for the room. However, oftentimes the lighting system may overcompensate an existing bright window wall where the lighting system may lower the dimming setting too far and thus create a "cave effect" whereby the illuminance ratio from the window wall to the surrounding wall and task surfaces may be too great for comfort. Proper photo sensor instrumentation for illuminance ratio control may be configured to help establish the correct setting for the shades as well as for the lights even though it may cost more energy to accomplish this comfort setting. In addition, the lighting sensor may also provide the shading system with occupancy information which may be utilized in multi-use spaces to help accommodate different modes of operation and functionality. For instance, an unoccupied conference room may go into an energy conservation mode with the window coverings being deployed all the way up or down in conjunction with the lights and HVAC to minimize solar heat gain or maximize heat retention. Furthermore, the window coverings may otherwise enter into a comfort control mode when the space is occupied unless overridden for presentation purposes.

ASC 100 may also be configured to be customizable and/or fine-tuned to meet the needs of a structure and/or its inhabitants. For example, the different operating zones may be defined by the size, geometry and solar orientation of the window openings. ASC 100 control may be configured to be responsive to specific window types by zone and/or to individual occupants. ASC 100 may also be configured to give a structure a uniform interior/exterior appearance instead of a "snaggletooth" look that is associated with irregular positioning of window attachments.

ASC 100 may also be configured to receive and/or report any fine-tuning request and/or change. Thus, a remote controller and/or local controller may better assist and or fine-tune any feature of ASC 100. ASC 100 may also be configured with one or more global parameters for optimizing control and use of the system. Such global parameters may include, for example, the structure location, latitude, longitude, local median, window dimensions, window angles, date, sunrise and sunset schedules, one or more communication ports, clear sky factors, clear sky error rates, overcast sky error rates, solar heat gain limits for one or more window covering positions, positioning timers, the local time, the time that the shade control system will wait before adjusting the shades from cloudy to clear sky conditions (or vise versa) and/or any other user-defined global parameter.

ASC 100 may also be configured to operate, for example, in a specific mode for sunrise and/or sunset because of the low heat levels, but high sun spot, brightness, reflectance and veiling glare associated with these sun times. For example, in one embodiment, ASC 100 may be configured with a solar override during the sunrise that brings window coverings 255 down in the east side of the structure and move them up as the sun moves to the zenith. Conversely, during sunset, ASC 100 may be configured to move window coverings 255 down on the west side of the structure to correspond to the changing solar angle during this time period. In another embodiment, ASC 100 may be configured with a reflectance override during the sunrise that brings window coverings 255 down in the west side of the structure due at least in part to light reflected onto the west side of the structure, for example light reflected off an adjacent building with a reflective exterior. Moreover, when trying to preserve a view under unobtrusive lighting conditions, a Sunrise Offset Override or a Sunset Offset Override may lock in the shade position and prevent the ASC from reacting to solar conditions for a preset length of time after sunrise or a preset length of time before sunset.

Moreover, ASC 100 may be configured with a particular subset of components, functionality and/or features, for example to obtain a desired price point for a particular version of ASC 100. For example, due to memory constraints or other limitations, ASC 100 may be configured to utilize the average solar position of each week of a solar year, rather than the average solar position of each day of a solar year. Stated another way, ASC 100 may be configured to determine changes to the solar curve on a weekly basis, rather than on a daily basis. Moreover, ASC 100 may be configured to support a limited number of motor zones, radiometers and/or photometers, proactive and/or reactive algorithms, data logging, and/or the like, as appropriate, in order to obtain a particular system complexity level, price point, or other desired configuration and/or attribute. Further, ASC 100 may be configured to support an increased number of a particular feature (for example, motor zones), in exchange for support of a corresponding decreased number of another feature (for example, solar days per year). In particular, an ASC 100 having a limited feature set is desirable for use in small-scale deployments, retrofits, and/or the like. Additionally, an ASC 100 having a limited feature set is desirable to achieve improved energy conservation, daylighting, brightness control, and/or the like, for a particular building. Moreover, ASC 100 may be configured as a stand-alone unit having internal processing functionality, such that ASC 100 may operate without requiring computational resources of a PC or other general purpose computer and associated software.

For example, in an exemplary embodiment, ASC 100 comprises a programmable microcontroller configured to support 12 motor zones. The programmable microcontroller is further configured to receive input from 2 solar radiometers. Moreover, in order to provide scalability, multiple instances of an ASC 100 may be operatively linked (i.e. "ganged") together to support additional zones. For example, four ASCs 100 may be ganged together to support 48 zones. Additionally, ASC 100 is configured with an IP interface in order to provide networking and communications functionality. Moreover, ASC 100 may be configured with a local communication interface, for example an RS-232 interface, to facilitate interoperation with and/or control of or by third-party systems. ASC 100 may also be configured with one or more of a graphical user interface, buttons, switches, indicators, lights, and the like, in order to facilitate interaction with and/or control by a system user.

Further, in this exemplary embodiment, ASC 100 may be configured with a basic event scheduler, for example a scheduler capable of supporting weekly, bi-weekly, monthly, and/or bi-monthly events. ASC 100 may also be configured with a time-limited data log, for example a log containing information regarding manual and/or automatic shade moves, the solar condition for one or more days, system troubleshooting information, and/or the like, for a limited period of time (e.g., 30 days, or other limited period selected based on cost considerations, information storage space considerations, processing power considerations, and/or the like).

Moreover, in this exemplary embodiment, the programmable microcontroller of ASC 100 may be configured to utilize a limited data set in order to calculate one or more movements for a window shade. For example, ASC 100 may be configured to utilize one or more of ASHRAE algorithms, window geometry, window size, window tilt angle, height of the window head and sill off the floor, motor zone information, solar orientation, overhang information, window glazing specifications (i.e., shading coefficient, visible light transmission, and the like). ASC 100 may then calculate solar angles and/or solar intensity (i.e., in BTUs or watts per square meter) for each motor zone and/or solar penetration for each motor zone. Based on a measured and/or calculated sky condition, one or more window shades may then be moved to an appropriate position. ASC 100 may further utilize both shade movements resulting from real-time calculations (for example, calculations based on sensor readings) as well as scheduled shade movements.

As will be appreciated by one of ordinary skill in the art, the present invention may be embodied as a customization of an existing system, an add-on product, upgraded software, a stand-alone system, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical." When "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

We claim:

1. A method comprising:
   receiving, at an automated shade control system, shadow information indicating the presence of a calculated shadow at a first location of interest; and
   communicating, to a first motor, a first movement request configured to adjust a first window covering responsive to the calculated shadow at the first location of interest,
   wherein the receiving comprises:
   modeling, by the automated shade control system, at least a portion of a building and at least a portion of the surroundings of a building to create a shadow model; and
   querying, by the automated shade control system, the shadow model a first time to calculate the presence of calculated shadow at a first location of interest.

2. The method of claim 1, wherein the receiving further comprises querying, via the automated shade control system, the shadow model a second time to determine a duration of the calculated shadow at the first location of interest.

3. The method of claim 1, wherein the shadow information is generated by a shadow model external to the automated shade control system.

4. The method of claim 1, wherein the shadow information is generated by a shadow model internal to the automated shade control system.

5. The method of claim 1, further comprising adjusting, via the first motor, the first window covering responsive to the calculated shadow at the first location of interest.

6. The method of claim 2, wherein the communicating the first movement request is responsive to the duration exceeding a default shadow duration.

7. The method of claim 2, wherein the communicating the first movement request is responsive to the duration exceeding a user-input duration.

8. The method of claim 2, wherein, responsive to the duration not exceeding a default shadow duration, the movement request is not communicated to the first motor.

9. The method of claim 1, further comprising:
querying, by the automated shade control system, the shadow model a second time to calculate the presence of calculated shadow at a second location of interest; and
communicating, to a second motor, a second movement request configured to adjust a second window covering responsive to the calculated shadow at the second location of interest.

10. The method of claim 9, wherein the first motor is part of a first motor zone, and wherein the second motor is part of a second motor zone.

11. The method of claim 10, wherein the first motor zone is associated with a first tenant, and wherein the second motor zone is associated with a second tenant.

12. The method of claim 11, wherein the first tenant is associated with a first floor of a building, and wherein the second tenant is associated with a second floor of the building.

13. A method for controlling a window covering, the method comprising:
receiving, at an automated shade control system, shadow information indicating the presence of a calculated shadow at a first location of interest;
communicating, to a first motor, a first movement request configured to adjust a first window covering responsive to the calculated shadow at the first location of interest; and
receiving, at the automated shade control system, reflectance information indicating the presence of calculated reflected light at the first location of interest.

14. The method of claim 13, further comprising communicating, to the first motor, a second movement request configured to adjust the first window covering at least partially toward a fully closed position responsive to the reflectance information indicating the presence of calculated reflected light at the first location of interest at the same time that the shadow information indicates the presence of calculated shadow at the first location of interest.

15. A method for controlling a window covering, the method comprising:
receiving, at an automated shade control system, shadow information indicating the presence of a calculated shadow at a first location of interest;
communicating, to a first motor, a first movement request configured to adjust a first window covering responsive to the calculated shadow at the first location of interest;
using a reflectance model to calculate the presence of calculated reflected light at the first location of interest; and
communicating, to the first motor, a second movement request configured to adjust a first window covering at least partially toward a fully closed position responsive to the reflectance model indicating the presence of calculated reflected light at the first location of interest at the same time that the shadow model indicates the presence of calculated shadow at the first location of interest.

16. A method for controlling a window covering, the method comprising:
receiving, at an automated shade control system, shadow information indicating the presence of a calculated shadow at a first location of interest; and
communicating, to a first motor, a first movement request configured to adjust a first window covering responsive to the calculated shadow at the first location of interest,
wherein the first movement request is communicated to the first motor responsive to the automated shade control system determining the existence of a clear sky condition.

17. A method for controlling a window covering, the method comprising:
receiving, at an automated shade control system, shadow information indicating the presence of a calculated shadow at a first location of interest; and
communicating, to a first motor, a first movement request configured to adjust a first window covering responsive to the calculated shadow at the first location of interest,
wherein, responsive to the automated shade control system determining the existence of a cloudy sky condition, the first movement request is not communicated to the first motor.

18. A method for controlling a window covering, the method comprising:
receiving, at an automated shade control system, shadow information indicating the presence of a calculated shadow at a first location of interest;
communicating, to a first motor, a first movement request configured to adjust a first window covering responsive to the calculated shadow at the first location of interest; and
storing movement history information for the first window covering.

19. The method of claim 18, further comprising using, by the automated shade control system, the movement history information for the first window covering to prevent the first window covering from being moved for a limited period of time after the previous movement of the first window covering.

20. A method for controlling a window covering, the method comprising:
receiving, at an automated shade control system, shadow information indicating the presence of a calculated shadow at a first location of interest; and
communicating, to a first motor, a first movement request configured to adjust a first window covering responsive to the calculated shadow at the first location of interest,
wherein the first movement request is communicated responsive to a measured solar radiation value exceeding 60% of an ASHRAE theoretical clear sky solar radiation value.

21. A method for controlling a window covering, the method comprising:
receiving, at an automated shade control system, shadow information indicating the presence of a calculated shadow at a first location of interest;
communicating, to a first motor, a first movement request configured to adjust a first window covering responsive to the calculated shadow at the first location of interest;
receiving, by the automated shade control system, brightness information from a photometer associated with the window covering; and
communicating, to the first motor, a second movement request configured to adjust the first window covering at least partially toward a fully closed position responsive to the brightness information exceeding a threshold value.

22. A method for controlling a window covering, the method comprising:
using, by an automated shade control system, information related to at least one of solar penetration through a window or solar load on the window to establish a standard management routine for a window covering associated with the window;

receiving, at the automated shade control system, shadow information indicating the presence of calculated shadow on the window; and overriding, by the automated shade control system, the standard management routine responsive to the presence of calculated shadow on the window.

23. A method for controlling a window covering, the method comprising:

using, by an automated shade control system, information related to at least one of solar penetration through a window or solar load on the window to establish a standard management routine for a window covering associated with the window;

receiving, at the automated shade control system, reflectance information indicating the presence of calculated reflected light on the window; and overriding, by the automated shade control system, the standard management routine responsive to the presence of calculated reflected light on the window.

* * * * *